(12) United States Patent
Radichio

(10) Patent No.: US 6,286,329 B1
(45) Date of Patent: Sep. 11, 2001

(54) PIPE FREEZER

(76) Inventor: Arthur Radichio, 89 Gate La., Levittown, NY (US) 11756

( * ) Notice: Subject to any disclaimer, the term of this patent is extended or adjusted under 35 U.S.C. 154(b) by 0 days.

(21) Appl. No.: 09/562,751

(22) Filed: May 2, 2000

Related U.S. Application Data

(60) Provisional application No. 60/132,758, filed on May 6, 1999.

(51) Int. Cl.$^7$ ....................................... F25D 3/00
(52) U.S. Cl. ............................................... 62/293
(58) Field of Search ............................. 62/66, 293

(56) References Cited

U.S. PATENT DOCUMENTS

| | | | |
|---|---|---|---|
| 3,559,423 | 2/1971 | Scheidler | 62/293 |
| 3,742,723 | 7/1973 | Grisé | 62/293 |
| 4,309,875 | 1/1982 | Radichio | 62/66 |
| 4,433,556 | 2/1984 | Brady | 62/293 |
| 4,441,328 | 4/1984 | Brister | 62/53 |
| 4,944,161 | 7/1990 | VanDerSanden | 62/293 |
| 5,548,965 | 8/1996 | Chen et al. | 62/66 |
| 5,680,770 | 10/1997 | Hall et al. | 62/293 |
| 5,836,167 | 11/1998 | Clouston et al. | 62/66 |

FOREIGN PATENT DOCUMENTS

| | | | |
|---|---|---|---|
| 0145114B1 | 2/1984 | (EP) | F16L/55/10 |
| WO89/01110 | 6/1988 | (WO) | F16L/55/10 |

OTHER PUBLICATIONS

Econo Freeze portable CO2 pipe freezing equipment, Econo Freeze, Antioch, IL 60002.
The Advantages of Freezing a Pipe, Econo Freeze, Antioch, IL 60002.
The Savair Pipe Freezer, Don't Drain, Just Freeze, Spirotherm Inc., Glendale Heights. IL. 60139–2067.

*Primary Examiner*—William E. Tapolcai
(74) *Attorney, Agent, or Firm*—Michael D. Fitzpatrick

(57) ABSTRACT

A pipe freezing apparatus comprises a multi-cavity adapter and an evaporator adapted to be fitted therein. The present invention uses a multi-cavity adapter having from two to eight cavities to fit standard plumbing pipes in copper, steel and plastic, metric and US standard. The refrigeration evaporator fits into a cylindrical bore in the core of the radial multi-cavity array. The cavities are arrayed around the circumference of the bore. The adapter body that forms the array is of aluminum or the like. The coolant lines are elbowed at 90 degrees to the evaporator's longitudinal axis to facilitate attachment to the pipe in small or tight spaces and from the side of the pipe. The adapter body freely swivels around the evaporator thus reducing wear on the refrigeration tubes as the adapters are mounted on the section of pipe to be frozen. Thus any of the cavities can be lined up with the pipe. A set of special retainer mechanisms is used to tightly secure the adapter bodies to the section of pipe to be frozen, thus providing for close thermal contact. In use, the adapters are mounted on the pipe and secured. Then the cartridge evaporator is plug into the adapter. Then circulation of refrigerant flow is begun to cause an ice plug to form in the section of pipe to be frozen so that the pipe downstream of the freeze plug can be repaired. Preferably two units, a unit on either side of the pipe, are strapped in place to fully surround the pipe. Two different models are provided. The first uses a non-expendable refrigerant. The second model which uses an expendable refrigerant vents used refrigerant to the atmosphere.

23 Claims, 18 Drawing Sheets

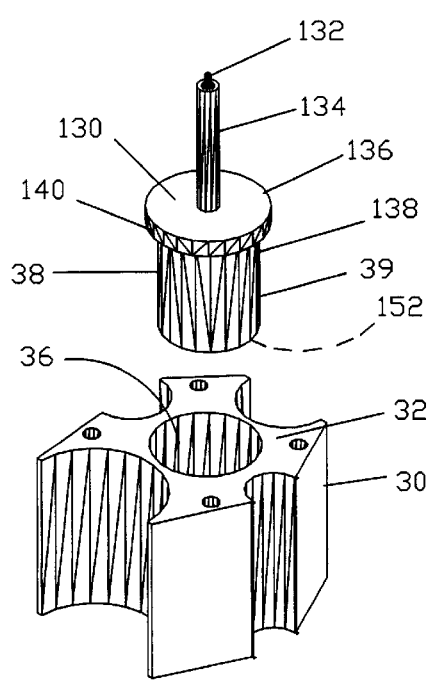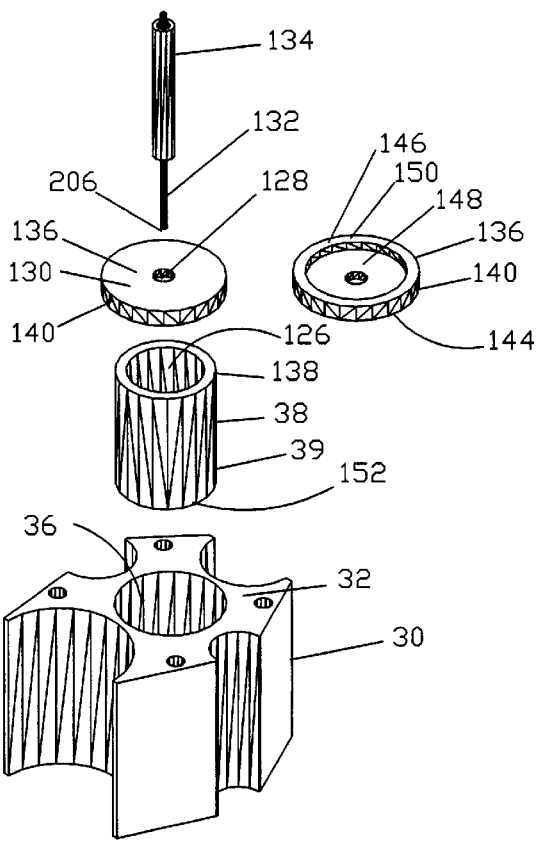

Fig. 9
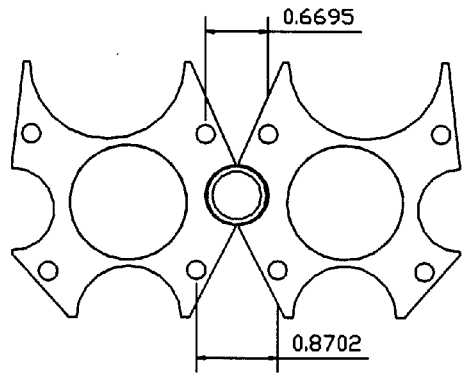
Pipe OD = 0.65
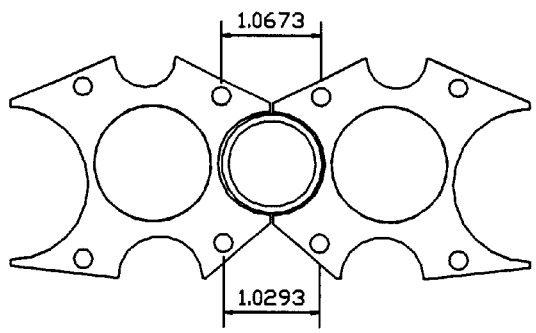
Pipe OD = 1.15
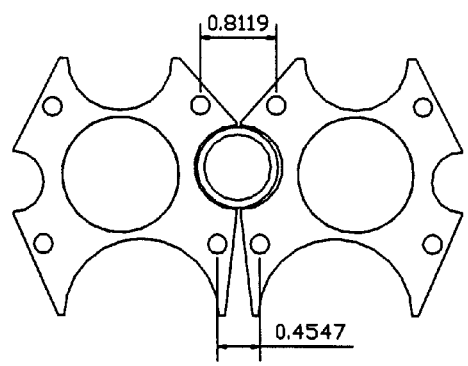
Pipe OD = 0.90
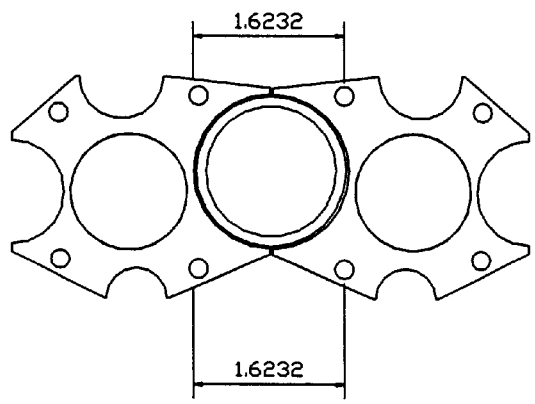
Pipe OD = 1.65

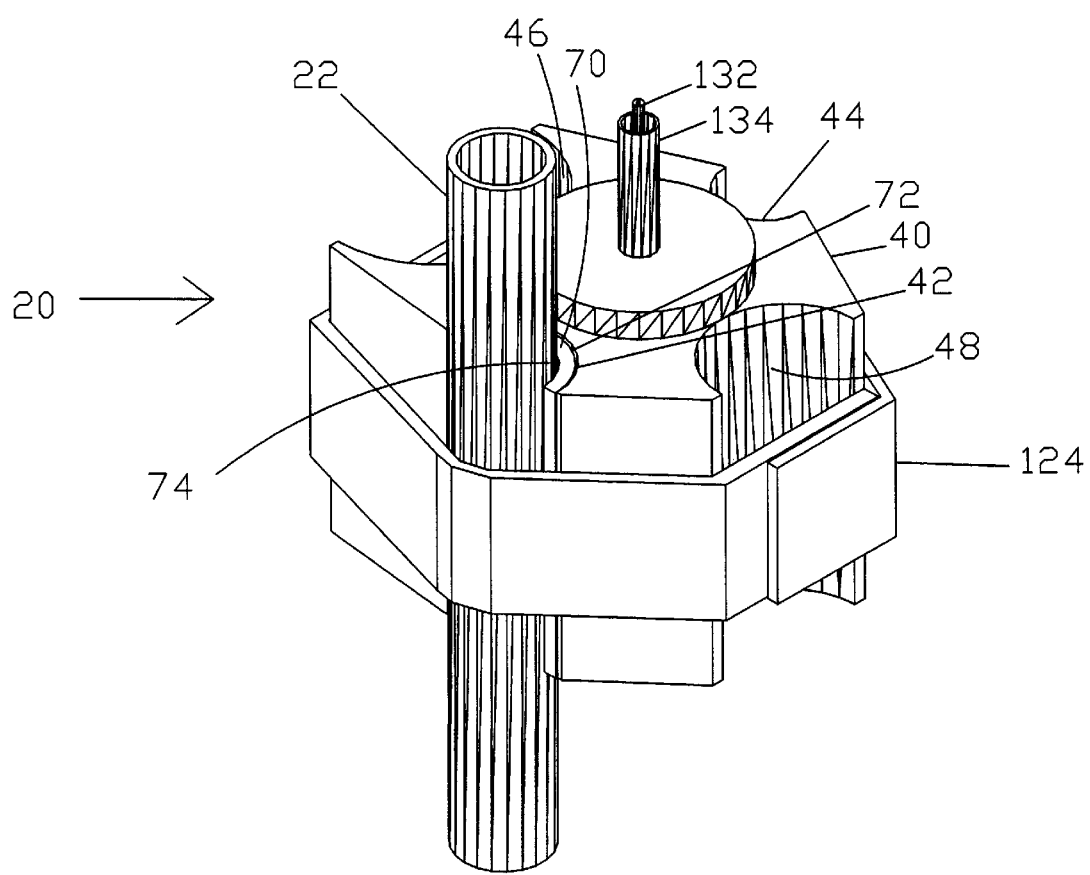

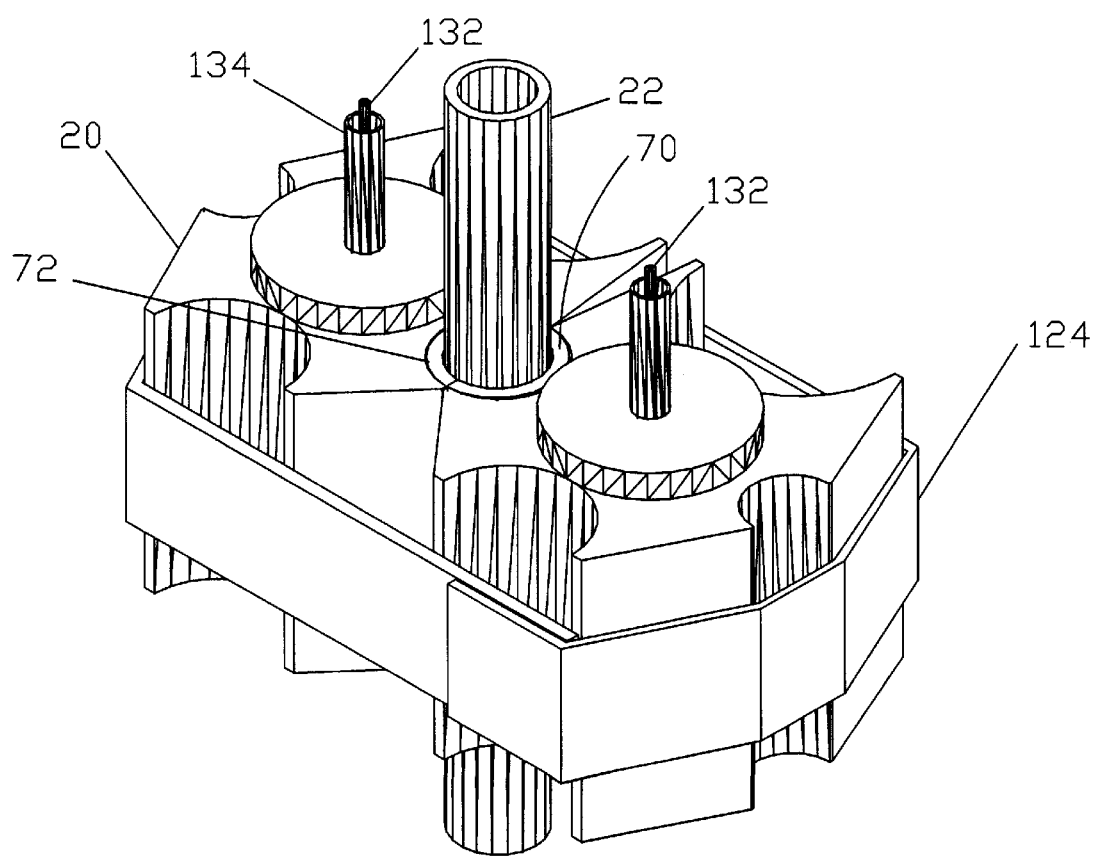

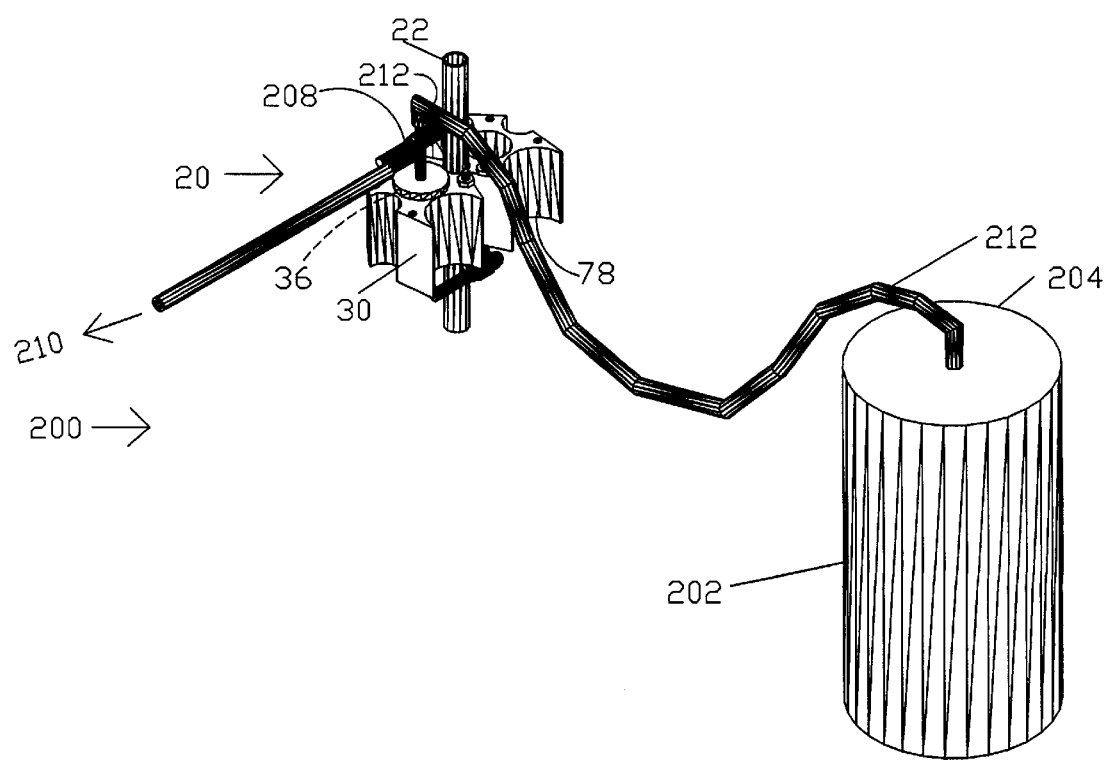

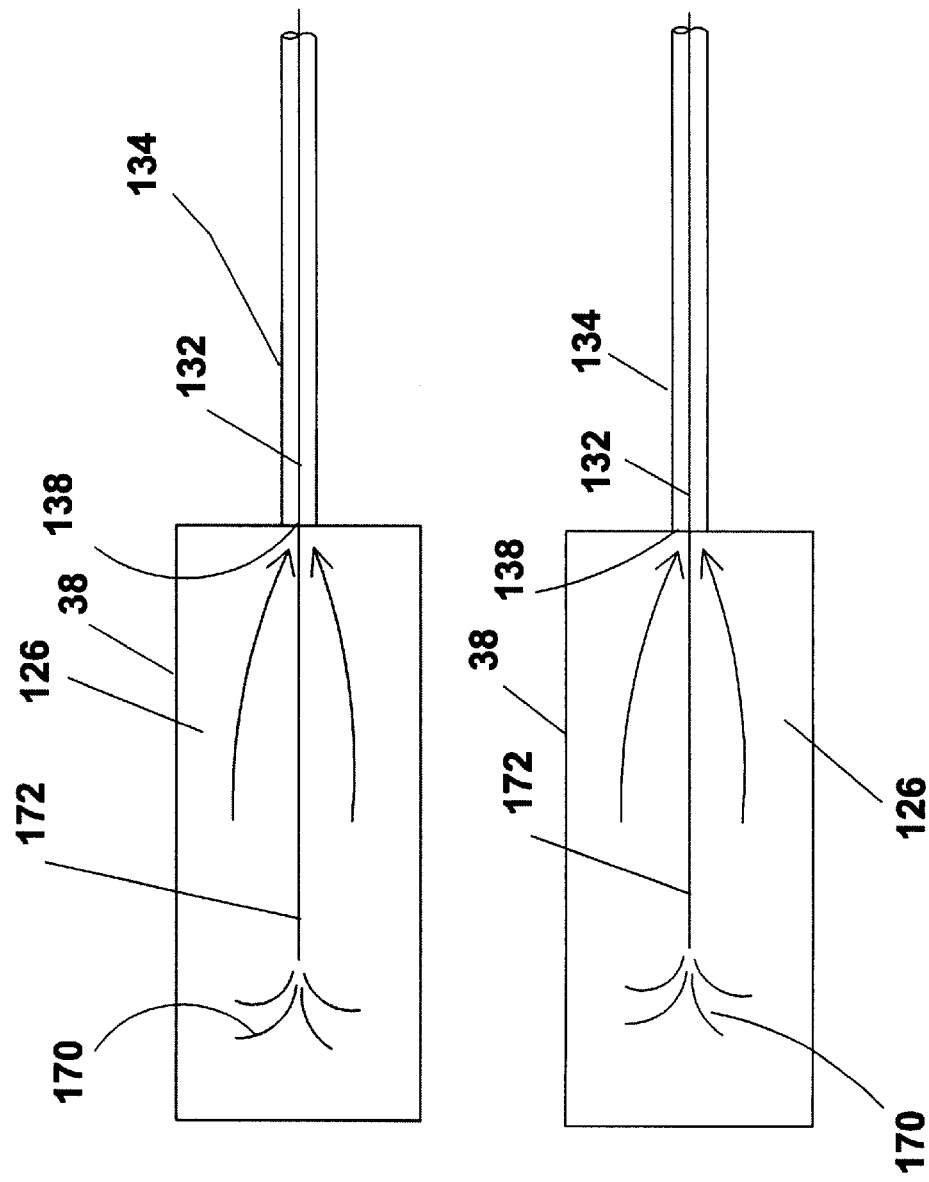

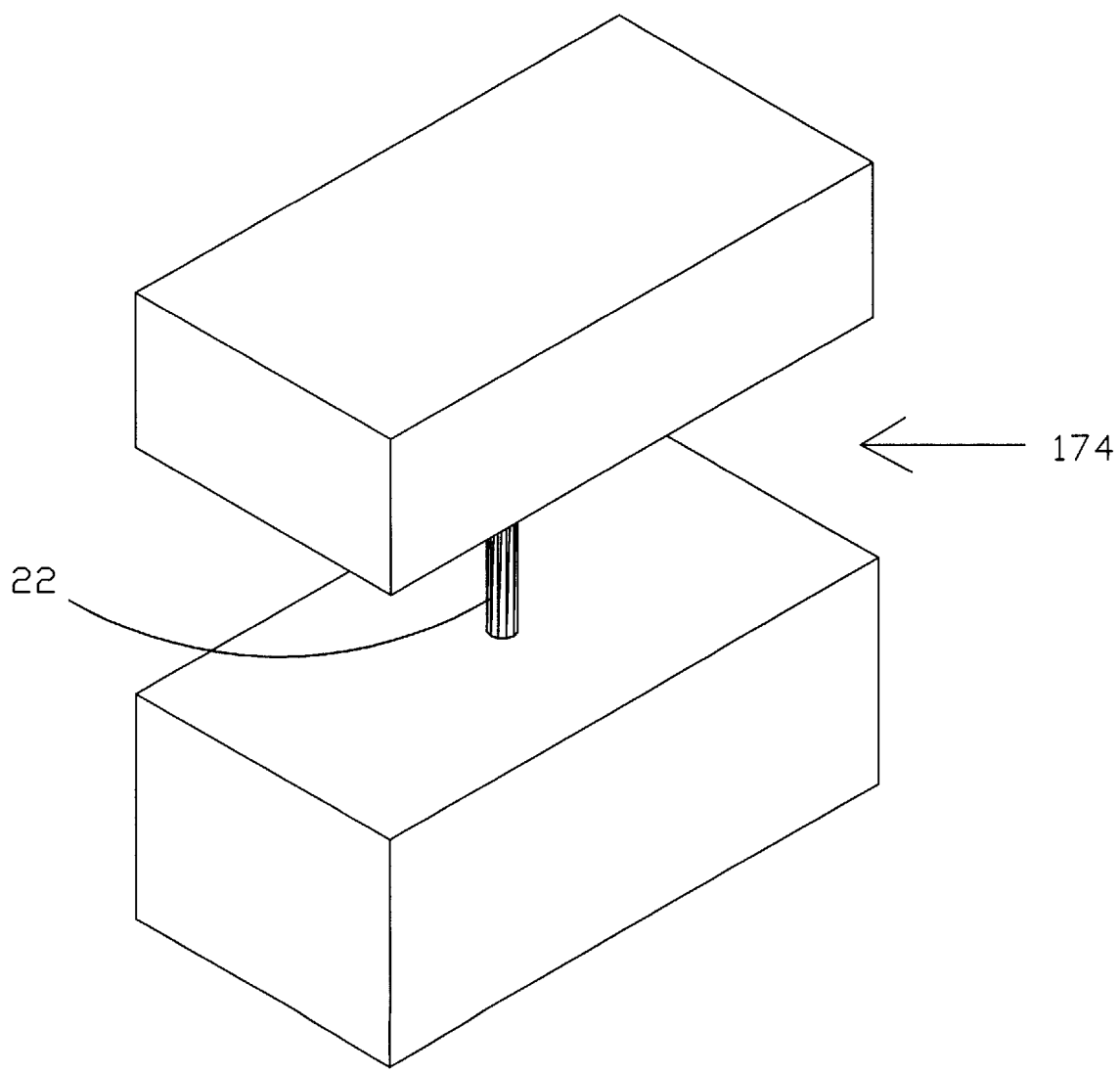

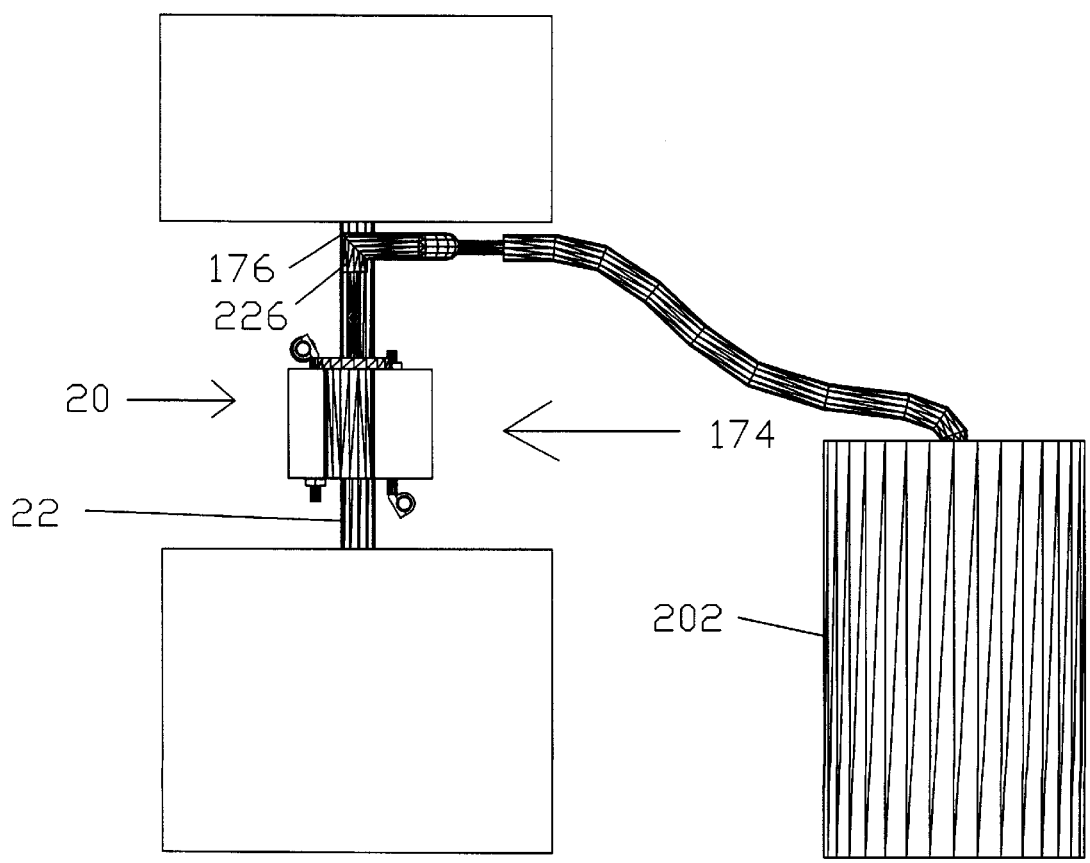

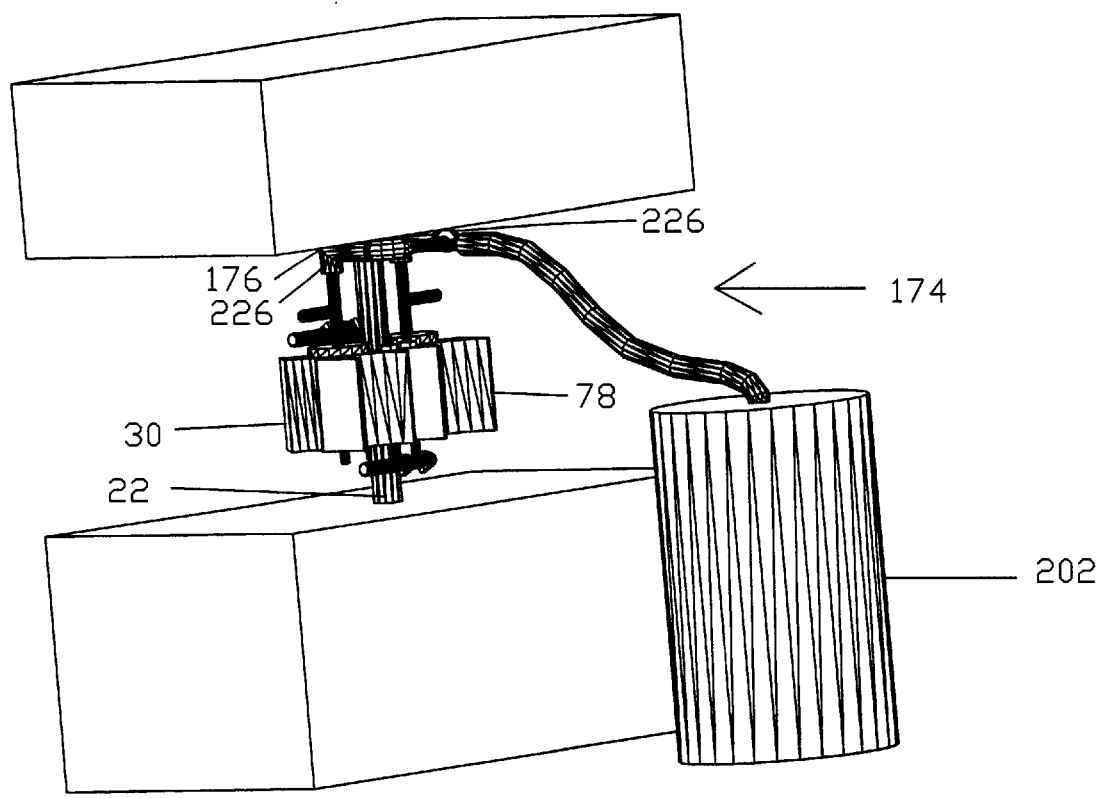

PIPE FREEZER

RELATED APPLICATIONS

This application claims the benefit of U.S. Provisional Application No. 60/132,758 filed on May 6, 1999.

FIELD OF THE INVENTION

The present invention relates to an apparatus for freezing a plug of frozen liquid in a liquid-filled pipe, to plug said pipe at a point where there is no conventional valve, so that pipe repairs can be performed downstream of the plug.

BACKGROUND ART
PIPE FREEZERS USING EXPENDABLE REFRIGERANTS

A pipe freezer works by removing heat quickly enough from the liquid within a section of pipe that an ice plug forms in that section of pipe, thus effectively preventing the flow of liquid through that section of pipe. This ice plug acts as a temporary valve. When the ice plug is properly maintained (kept frozen), repairs can be performed on the pipe in the vicinity of the ice plug without the need to drain the piping system.

TWO PRIMARY METHODS OF FREEZING PIPES
  1. Expendable refrigerants sprayed directly onto the pipe and vented to the atmosphere.
  2. Compression cycle refrigeration, which circulates the same refrigerant in a closed loop as a refrigerator does.
  1. Expendable refrigerants: These are the traditional refrigerants for freezing the contents (in a small section of pipe 5.08 cm–25.4 cm (2 in–10 in) in length) within plumbing piping or other fluid carrying conduits with a liquid that will freeze within the temperature range of the refrigerant being used.

The three more commonly used expendable refrigerants are listed below with their refrigerant number and boiling point at sea level (14.7 PSIA).
  1. Liquid Carbon Dioxide: R744, −109 F. (−78 C)
  2. Liquid Nitrogen: R728, −320 F. (−196 C)
  3. Liquid Helium: R707, −425 F. (−269 C)

On pipes up to three 7.62 cm (three inches) of inner diameter the refrigerant of choice is carbon dioxide. There are five or more kits using carbon dioxide currently on the market in the US. Liquid nitrogen and liquid helium are not as available, are only packaged in large containers, and require additional safety training. There are companies that specialize in pipe freezing of pipes up to 152.4 cm (60 in) inside diameter. On pipes this large, liquid nitrogen or liquid helium would be used depending upon the application.

The current expendable refrigerant pipe freezing kits (for pipes up to 7.62 cm (3 in) ID) employ bags or collars that wrap around the pipe. The collars are hinged on one side and have a locking screw. The bags are wrapped around the pipe and tied on each end. Each type of kit has a spray head, which sprays the refrigerant over the pipe. A high-pressure hose delivers the liquid refrigerant to the spray heads from the tank.

As the liquid refrigerant is sprayed over the pipe within the bag or collar, dry ice is being formed due to the containment of the refrigerant (i.e., the refrigerant is not allowed to fully evaporate into the atmosphere). When enough dry ice is formed, the refrigerant valve on the tank is closed stopping the flow of refrigerant in to the bag or collar. To conserve refrigerant, heat is now removed from the pipe through the dry ice. The ability of the dry ice to remove heat from the pipe is much less than that of the denser liquid refrigerant. Throughout the process, the liquid refrigerant is turned on and off to conserve refrigerant, while depending on the dry ice, which was formed, to remove heat from the pipe.

Draw backs of free flow systems over Applicant's Multi-Cavity Adapter /Cartridge Evaporator
  1. Requires longer freeze times.
  2. Consumes more refrigerant
  3. Cannot control vented gas location
  4. Cost of equipment.
  5. Danger of hose failure due to cold bending.

DESCRIPTION OF RELATED ART INCLUDING INFORMATION DISCLOSED UNDER 37 CFR 1.97 AND 37 CFR 1.98.

The present inventor invented U.S. Pat. No. 4,309,875 issued to Radichio Jan. 12, 1982 for a Pipe Freezer or the Like, in which a self contained freezing device forms a plug of ice within a pipe section. A refrigeration unit supplies refrigerant to a cradle-like freezer unit within which the section of pipe to be frozen is held in spaced relation to the inner face of the freezer. The space between the underside of the pipe and the inner face of the freezer is filled with water, for example, by spraying. As the water in contact with the cradle-like freezer unit freezes, it covers the outer surface of the pipe section with an ice jacket. Alternatively, a bag of freezable gel may be substituted for the water spray and placed over the inside face of the freezer; and then the pipe section is placed within the fold of the bag. In the case of either alternative, the refrigerant is maintained inside the freezer, and out of contact with the pipe.

My U.S. Pat. No. 5,548,965 to Chen and Radichio issued on Aug. 27, 1996 for a Multi-cavity Evaporator which has an outer surface and an inner chamber. The outer surface has at least two pipe receiving surfaces and a pair of ends. The evaporator has a bore extending from one of the ends to the inner chamber. A tube extends into the bore sealing the chamber, such that a refrigerant flows into the inner chamber through an inner tube and out of the inner chamber through the outer tube. Each of the pipe receiving surfaces has a distinct surface adapted for receiving different size pipes.

BRIEF SUMMARY OF THE INVENTION.

The present invention uses a multi-cavity adapter having from two to eight cavities to fit standard plumbing pipes in copper, steel and plastic, metric and US standard. The refrigeration evaporator fits into a cylindrical bore in the core of the radial multi-cavity array. The cavities are arrayed around the circumference of the bore. The extrusion that forms the array is of aluminum or the like.

The coolant lines are elbowed at 90 degrees to the evaporator's longitudinal axis to facilitate attachment to pipes in small or tight spaces and from the side of the pipes. The central bore in the adapter body has a diameter slightly larger than the diameter of the evaporator which allows the evaporator to swivel freely in the adapter body thus minimizing wear and tear on the refrigeration lines to the evaporator when the evaporator is inserted into the central bore of an adapter body of the multi cavity adapter. Any of the cavities on the adapter body can be lined up with the pipe. When a single adapter is being used, the adapter is positioned on the pipe and secured with a strap having hook and loop fastening material. Then the cartridge evaporator is plugged into the adapter.

More preferably two units, a unit on either side of the pipe, are strapped in place to fully surround the pipe. Most preferably a special set of adjustable retainer mechanisms is used to tightly secure the adapters to the section of pipe to be frozen.

BRIEF DESCRIPTION OF THE SEVERAL VIEWS OF THE DRAWING.

FIG. 5A is a side perspective view of an adapter body with the cartridge evaporator removed;

FIG. 5B is an exploded view of FIG. 5A, and also shows a turned over evaporator cap to show its details;

FIG. 9 shows the adjustment settings of the special retainer mechanism required to interconnect the adapter bodies around any of the four standard pipe sizes that the adapter bodies can accommodate;

FIG. 11 shows a single adapter strapped to a pipe;

FIG. 12 which shows two adapters strapped to a pipe;

FIG. 13A shows a perspective view of a pipe freezing system having one evaporator utilizing expendable refrigerants which utilizes my multi cavity adapter;

FIG. 16 is a diagrammatic plan view of the invention in use when using an nonexpendable refrigerant;

FIG. 17 is a perspective view of the tight space of FIG. 16 showing the invention mounted upon the section of pipe to be frozen;

FIG. 18 is a perspective view of the tight space of FIG. 16 showing the invention mounted upon the section of pipe to be frozen;

FIG. 19 is a perspective view of FIG. 18;

DETAILED DESCRIPTION OF THE INVENTION.

Detailed Description of the Elements of the Preferred Embodiment

Figure 1:
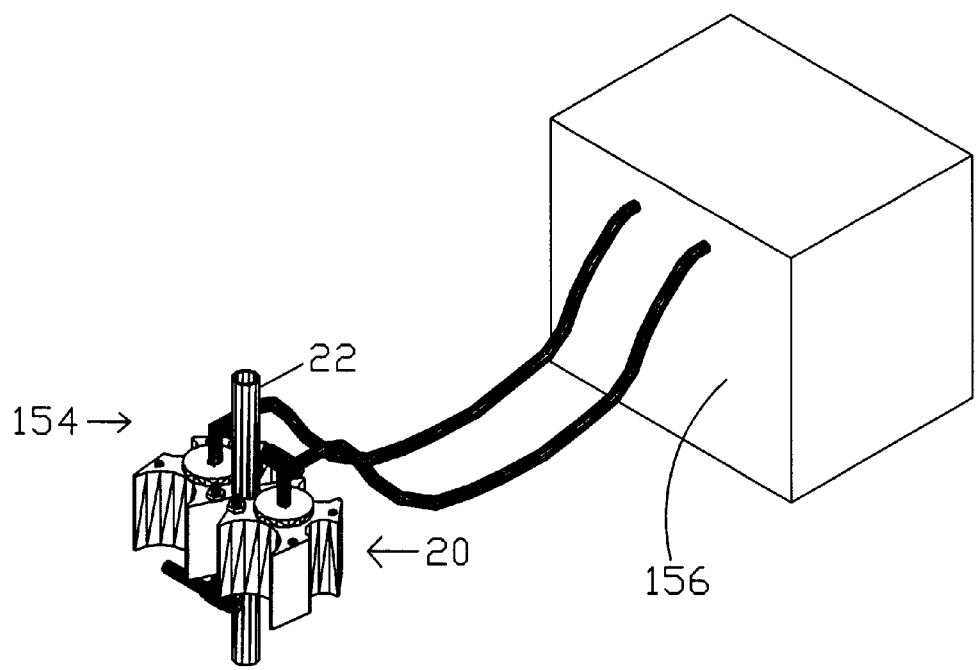
FIG. 1 is a perspective view of a pipe freezing system utilizing my multi cavity adapter and using nonexpendable refrigerants.
Figure 6:
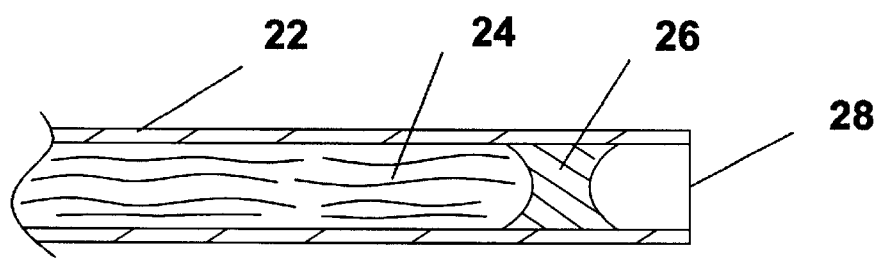
FIG. 6 shows an elevation in section of a pipe with frozen plug.

Turning now descriptively to the drawings, in which similar reference characters denote similar elements throughout the several views, FIG. 1 illustrates a perspective view of a pipe freezing system (utilizing non-expendable refrigerants) utilizing my multi-cavity adapter. (FIG. 13, described later, illustrates a perspective view of a pipe freezing system utilizing expendable refrigerants which utilizes my multi cavity adapter.) The multi-cavity adapter, generally designated as 20 in FIG. 1, is designed for the removal of heat from liquid filled pipes, such as 22, to bring the liquid contents 24, as in FIG. 6, below the liquid's freezing point, and to cause an ice blockage 26, as in FIG. 6, within pipe 22. With ice plug 26 in place, pipe 22 may now be cut open as at 28, to make plumbing repairs without the need of a valve.

Figure 2:
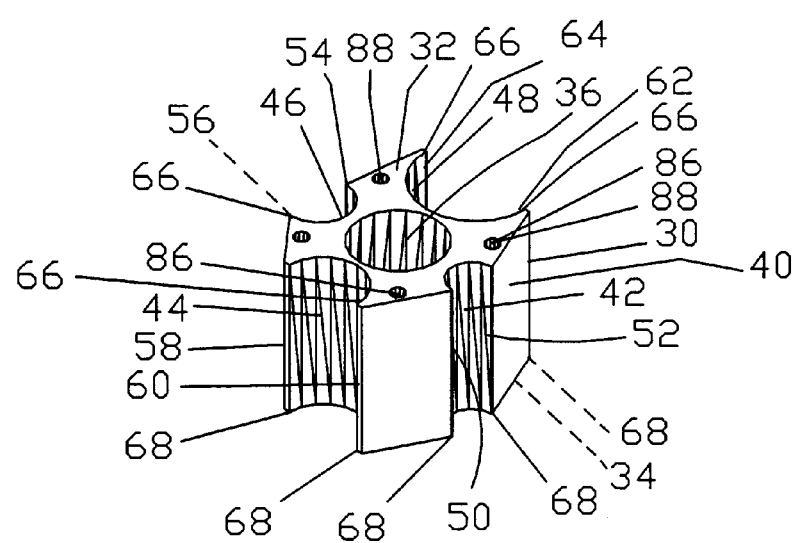
FIG. 2 is a perspective view of one of the adapter bodies of the multi cavity adapter.
Figure 3:
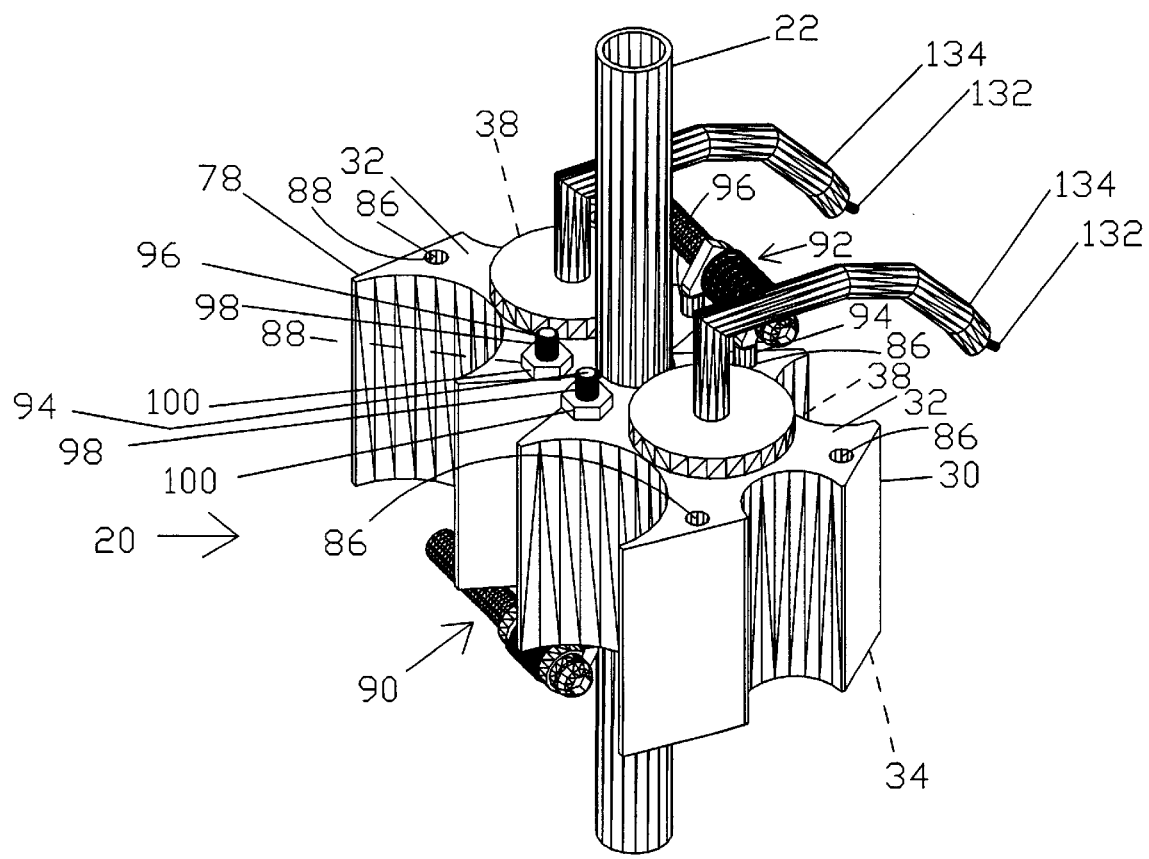
FIG. 3 is an enlarged perspective view of FIG. 1 with most of the protective hose and the refrigeration system removed.

As best seen in FIGS. 2 and 3, the multi-cavity adapter for a pipe freezer, generally shown by reference numeral 20, consists of an elongated piece of thermally conductive material 30 which has a first end face 32, a second end face 34, and a bore 36 passing through the piece of thermally conductive material 30. This elongated piece of thermally conductive material 30 will be referred to as an adapter body. The bore 36 serves as a cartridge evaporator receiving port for the reception of a cartridge evaporator 38 therein. FIG. 5A shows a cartridge evaporator 38 removed from the cartridge evaporator receiver port 36 of an adapter body 30. FIG. 5B is an exploded view of FIG. 5A, and also shows a evaporator cap 136 upside down to reveal its structure. The bore 36 extends from the first end face 32 to the second end face 34 of the adapter body 30. Preferably, the bore 30 is a central bore 30. The outer surface 40 of the adapter body 30 has a plurality of concave pipe receiving surfaces 42–48. Preferably, each concave pipe-receiving surface 42–48 has an arc of approximately 180 degrees. Each concave pipe receiving surface 42–48 has a specific distinct radius of curvature which is different than the radii of curvature of the other pipe receiving surfaces 42–48. Thus, pipes 22 with different outside diameters can be quickly and easily accommodated. (Please see FIG. 9.) The intersection of each pipe receiving surface 42–48 and the outer surface 40 defines a first corner edge 50, 54, 58, 62 and a second corner edge 52, 56, 60, 64 of each of the pipe receiving surfaces 42–48. The intersection of each corner edge 50–64 with the first end face 32 defines a corner point of the first end face. The intersection of each corner edge with the second end face 34 defines a corner point of the second end face 34.

Applicant's preferred embodiment of a multi cavity adapter 20 has an adapter body 30 with at least four pipe receiving surfaces 42–48 so that various sized pipes can be accommodated. As shown in FIGS. 2 and 9, the four pipe receiving surfaces 42–48 of the adapter body can accommodate pipes with outside diameters of 1.651 cm, 2.921 cm, 2.286 cm, and 4.191 cm (0.65, 1.15, 0.90, and 1.65 inches) respectively. The adapter body 30 of the multi cavity adapter 20 is thus designed to fit standard plumbing pipes in copper, steel and plastic, in both metric and US standard sizes. Occasionally, however, one will be required to freeze a pipe with a diameter which is different from that of the four pipe receiving surfaces 42–48. For this purpose applicant's invention also includes a bushing adapter 70 (also called a reducer bushing, or sleeve) for accommodating pipes with other outside diameters. As shown in FIGS. 11–12, the outer surface 72 of the bushing adapter 70 is convex and complimentary to one of the concave pipe receiving surfaces 42–48 of the adapter body 30. The inner surface 74 of the bushing adapter 70 is concave and has a specific distinct radius different from the pipe receiving surfaces 42–48 of the adapter body 30 and is adapted to receive a pipe.

Figure 8:
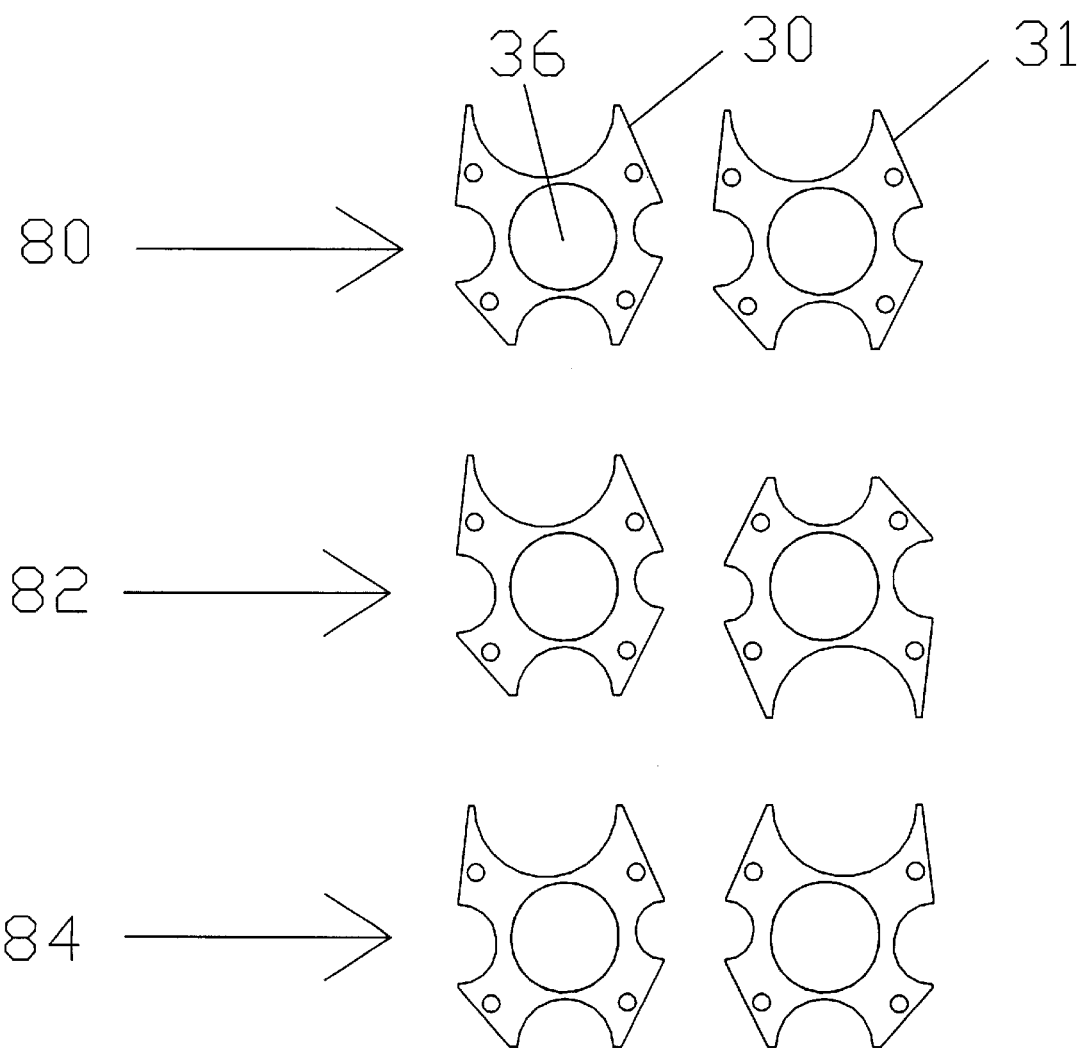
FIG. 8 is an illustration of the fact that the secondary adapter body is substantially a mirror image of the primary adapter body.

Preferably, as shown in FIG. 3, Applicant's invention includes a second elongated piece of thermally conductive material 78 which will be referred to as the secondary adapter body 78, and, in this case, the first elongated piece of thermally conductive material 30 will be referred to as the primary adapter body. The secondary adapter body 78 is substantially a mirror image of the primary adapter body 30. (It should be noted, as shown in FIG. 8, that if one places two of the primary adapter bodies 30, 31 in a row 80 from left to right, and the second one 31 in the row 80 is rotated about the central axis of its central bore 36 by 180 degrees (as shown in row 82) and then turned upside down (as in row 84), it is a mirror image of the first one 30 in the row.)

Applicant's invention contemplates two ways of fastening the multi cavity adapters 20 to the section of pipe 22 to be frozen. In Applicant's preferred embodiment as shown in FIG. 3, both the primary 30 and secondary 78 adapter bodies have locking channels 86 which are substantially parallel to the axes of the central bores 36 of the adapter bodies and extend from the first end face 32 to the second end face 34 of each of the adapter bodies 30, 78. As shown in FIG. 1 there are four locking channels 86 in each adapter body. Each locking channel 86 has a channel opening 88 in the first end face 32 and a second channel opening 89 in the second end face 34. Preferably, the circular edges of the channel openings 88, 89 of these locking channels 86 are approximately 0.25 cm (0.1 inches) from an edge of the adapter first end face 32 and situated between the corner points of the first end face 32 at a position where there will be no interference between the pipe section 22 to be frozen and the retainer mechanisms 90, 92 when the retainer mechanisms 90, 92 are inserted in those channels 86. Most preferably as shown in FIG. 9, the channel openings 88 of these locking channels 86 are situated such that the number of adjustment settings of the special retainer mechanism required to interconnect the adapter bodies around any of the four standard pipe sizes that the adapter bodies can accommodate are minimized.

Special adjustable fastening mechanisms such as the retainer mechanisms 90, 92 as shown in FIG. 3 (and in greater detail in FIG. 10 which is an exploded view of these) are used to fasten the primary 30 and secondary 78 adapter bodies to the section of pipe 22 to be frozen. The first retainer mechanism 90 has a first prong 94 and a second prong 96. These prongs 94, 96 are threaded at their ends 98. The first prong 94 is adapted to be received into a channel opening 88 of the primary adapter body 30, and the second prong 96 is adapted to be received into a channel opening 88 of the secondary adapter body 78, so that when the primary 30 and secondary 78 adapter bodies are aligned such that a pipe receiving surface 42–48 of the primary adapter body 30 is facing a pipe receiving surface 42–48 of the secondary adapter body which has the same radius of curvature as the primary adapter body 30, the primary 30 and secondary 78 adapter bodies can be hingedly fastened together by the first retainer mechanism 90, such that the primary 30 and secondary 78 adapter bodies can be draped around the section of pipe 22 which is to be frozen. The first retainer mechanism 90 includes two nuts 100, 100 for threading onto the ends 98, 98 of the threaded prongs 94, 96 for securing the first retainer mechanism 90 in the locking channels 86, 86.

The second retainer mechanism 92 is essentially similar to the first retainer mechanism 90. It has a first prong 94 and a second prong 96, and the prongs are threaded at their ends. The first prong 94 is adapted to be received into a locking channel 86 of the primary adapter body 30, and the second prong 96 is adapted to be received into a locking channel 86 of the secondary adapter body 78, so that the primary 30 and secondary 78 adapter bodies can be fastened together, such that the primary 30 and secondary 78 adapter bodies can tightly encompass and secure the section of pipe 22 which is to be frozen.

Figure 10:
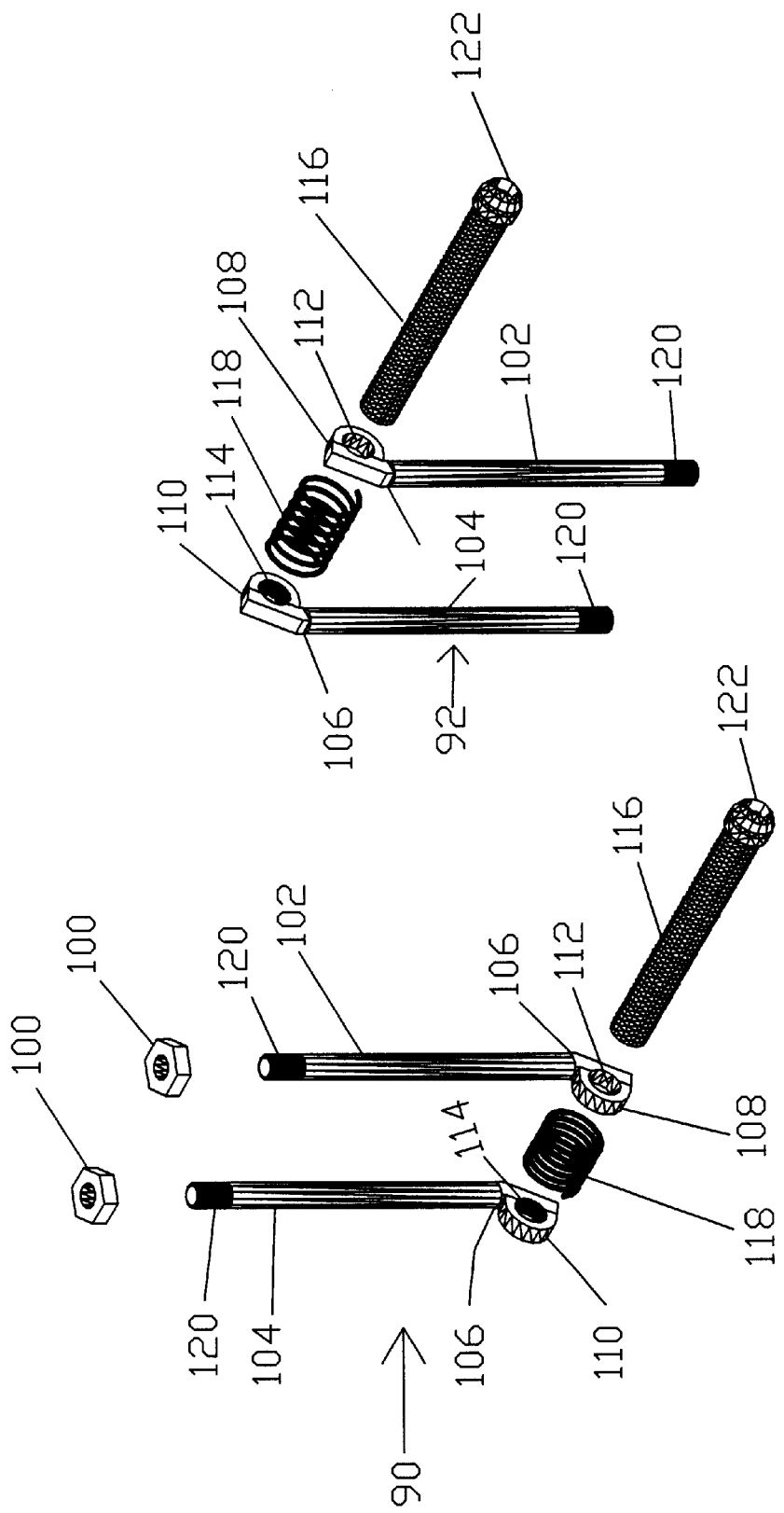
FIG. 10 is an exploded view of the special retainer mechanisms.

In Applicant's preferred embodiment, special retainer mechanisms 90, 92 as shown in FIG. 3, are used to fasten the multi-cavity adapters 20 to the section of pipe 22 to be frozen. Each retainer mechanism 90, 92 consists of a first and second locking pin 102, 104, a straight pin 116, which interconnects them, and a spring 118 under tension mounted on the straight pin 116 between the two locking pins 102, 104 to hold the locking pins 102, 104 apart from one another. As best seen in FIGS. 3 and 10, the first retainer mechanism generally shown by reference number 90 in FIG. 10 consists of a first locking pin 102 whose first end 106 has a golf club-like head 108 which has a nonthreaded hole 110. The golf club-like head 108 is offset from the central axis of the locking pin 102 so that when the retainer mechanisms 90, 92 are inserted into the adapter bodies to be joined, the offsets will ensure that the straight pins 116, 116 of the retainer mechanisms 90, 92 will not come in contact with the section of pipe 22 to be frozen. These golf club-like heads 108, 110 are referred to as offset golf club-like heads. The second end 120 of the first locking pin 102 is threaded. The second locking pin 104, likewise, has a golf club-like head 110 which has a threaded hole 114. The diameter of this threaded hole 114 is smaller than the diameter of the nonthreaded hole 112 in the golf club-like head 108 of the first locking pin 102. The second end 120 of the second locking pin 104 is threaded. These two locking pins 102, 104 are connected via a straight pin 116. The straight pin 116 has a first end with an Allen head 122 with a diameter larger than the diameter of the nonthreaded hole 112 in the golf club-like head 108 of the first locking pin 102. The straight pin is threaded except for the Allen head end 122. The straight pin 116 is adapted to be inserted into the nonthreaded hole 112 of the offset golf club like head 108 of the first locking pin 102. It is then pushed through that hole 112 until it engages the threaded hole 114 of the offset golf club like head 110 of the second locking pin 104, and then is screwed into the threaded hole 114 of the second locking pin 104. A pair of nuts 110, 110 are screwed onto the second ends 120, 120 of each locking pin to secure the first retainer mechanism 90 in the locking channels 86, 86. The Allen head end 122 of the straight pin 116 is then turned to draw together the golf club-like heads 108, 110 of the locking pins 102,104 and thus tighten and secure the adapter bodies 30, 78 on the section of pipe 22 to be frozen.

Preferably, a spring 118 under tension is mounted on the straight pin 116 of each retainer mechanism 90, 92. This spring 118 serves to push apart and hold the first and second locking pins 102, 104 in substantially parallel alignment to one another, which enables one to simultaneously insert the locking pins 102, 104 into corresponding locking channels 86, 86 of the primary 30 and secondary 78 adapter bodies.

The second retainer mechanism 92 consists of a first locking pin 102 whose first end 106 has a golf club-like head 108 which has a nonthreaded hole 110. Again, the golf club-like head 108 is offset from the central axis of the locking pin 102 so that when the retainer mechanisms 90, 92 are inserted into the adapter bodies to be joined, the offsets will ensure that the straight pins 116, 116 of the retainer mechanisms 90, 92 will not come in contact with the section of pipe 22 to be frozen. As mentioned above in the description of the first retainer mechanism, these golf club-like heads 108, 110 are referred to as offset golf club-like heads. The second end 120 of the first locking pin 102 is threaded. The second locking pin 104, likewise, has a golf club-like head 110 which has a threaded hole 114. The diameter of this threaded hole 114 is smaller than the diameter of the nonthreaded hole 112 in the golf club-like head 108 of the first locking pin 102. The second end 120 of the second locking pin 104 is threaded. These two locking pins 102, 104 are connected via a straight pin 116. The straight pin 116 has a first end with an Allen head 122 with a diameter larger than the diameter of the nonthreaded hole 112 in the golf club-like head 108 of the first locking pin 102. The straight pin is threaded except for the Allen head end 122. The straight pin 116 is adapted to be inserted into the nonthreaded hole 112 of the offset golf club like head 108 of the first locking pin 102. It is then pushed through that hole 112 until it engages the threaded hole 114 of the offset golf club like head 110 of the second locking pin 104, and then is screwed into the threaded hole 114 of the second locking pin 104.

In use, the locking pins 102, 104 of the second retainer mechanism 92 are not fully inserted into the locking channels 86, 86. Therefore, when the Allen head 122 of the straight pin 116 is tightened, thus pulling the upper parts of the locking pins 102, 104 together, the lower tips 120, 120 of the locking pins 102, 104 spread apart and contact the inner walls of the locking channels 86, 86. Thus the locking pins 102, 104 bind in the locking channels 86, 86, thus securing the locking pins 102, 104 in the locking channels 86, 86, and a second set of nuts is not needed to hold the locking pins 102, 104 of the second retainer mechanism in the locking channels 86, 86. In other words, by tightening the Allen head 122 of the straight pin 116 interconnecting the two locking pins 102, 104, we can make the distance between the two locking pins 102, 104 less than the distance between the channel openings 88, 88 of the adapter bodies 30, 78 we are fastening together around the section of pipe 22 to be frozen, and thus the locking pins 102, 104 will bind as you push them into their set of channel openings 88, 88. The approximate distances between channel openings of the adapter bodies to be joined by the retainer mechanisms 90, 92 in Applicant's preferred embodiment are shown in FIG. 9.

Applicant has found that if both retainer mechanisms 90, 92 are inserted in the same ends of the adapter bodies 30, 78, when the Allen heads of the straight pins 116, 116 are turned to tighten the locking pins 102, 104, the adapter bodies 30, 78 are pulled together at that end and tend to spread apart at the other end. The result is that there is not a good overall contact of the adapter bodies 30, 78 on the section of pipe 22 to be frozen. Therefore, preferably, if the first retainer mechanism 90 is inserted in channel openings 88, 88 of the first end faces 32, 32 of the primary 30 and secondary 78 adapters, the second retainer mechanism 92 should be inserted in channel openings 89, 89 of the second end faces 34, 34 of the primary 30 and secondary 78 adapters. When this is done, the two adapter bodies 30, 78 can be tightly secured to the section of pipe 22 to be frozen.

An alternate adjustable fastening mechanism for fastening a multi cavity adapter 20 to the section of pipe 22 to be frozen is a flexible strap with hook and loop fastener material such as shown in FIG. 11 which shows a single adapter 20 strapped to a pipe 22 and FIG. 12 which shows two adapters 20, 20 strapped to a pipe. In use, pipe 22 is wet. Then two adaptors 20 and 20 are strapped by hook and loop (such as Velcro®) strap 124 around pipe 22. Thus the two adaptors 20, 20 clamp to both sides of pipe 22.

Figure 4:
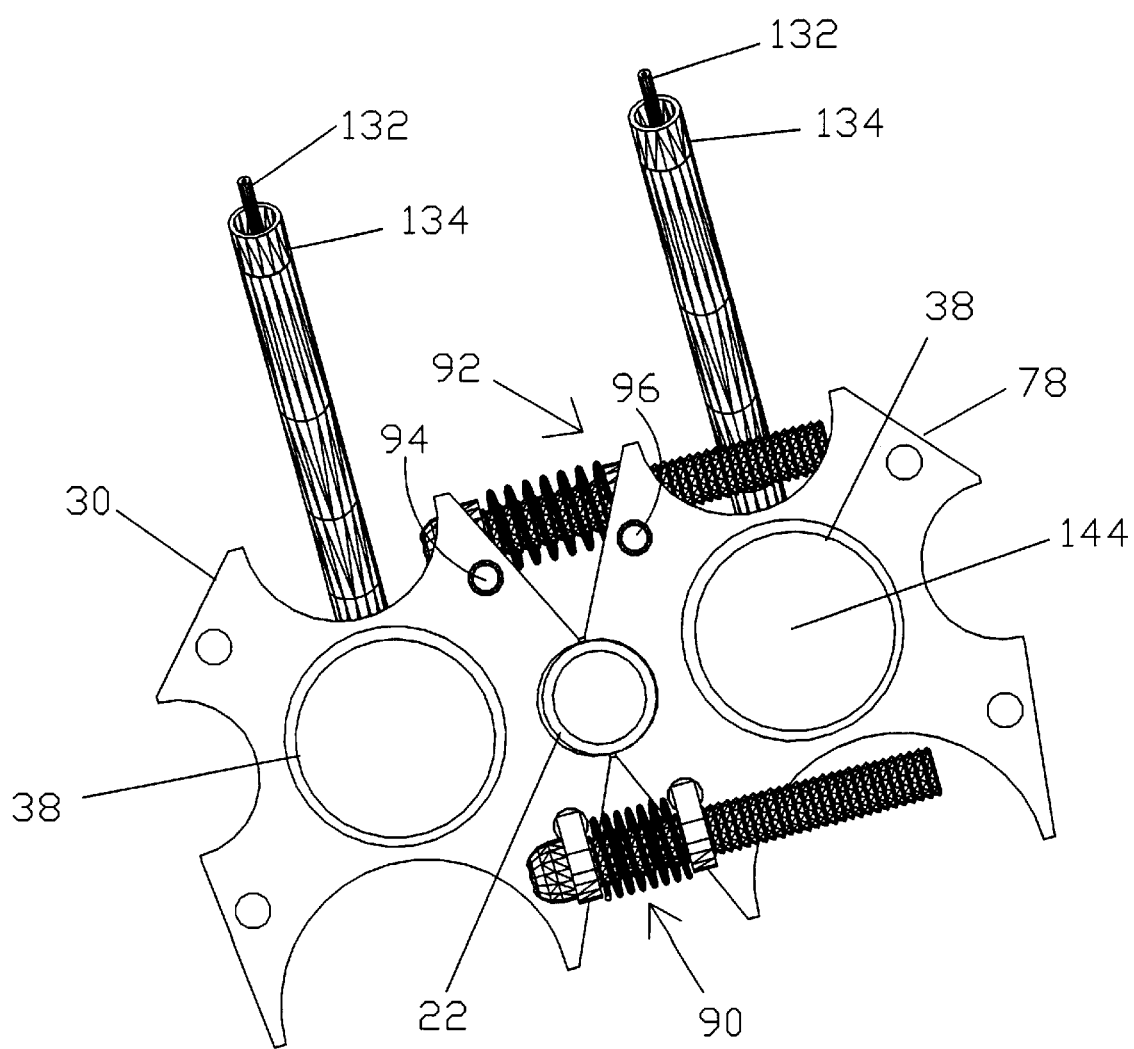
FIG. 4 is a bottom view of the FIG. 3.

As shown in FIGS. 1, 3, and 4, a close fitting cartridge type evaporator 38 is inserted in the central bore 36 of each adapter body 30, 78. This type of cartridge evaporator provides a way for using a refrigerant to freeze a pipe 22 for those types of pipe freezers which use Applicant's multi cavity adapter 20 to encompass the section of pipe 22 to be frozen.

As best seen in FIGS. 5A and 5B (which is an exploded view of FIG. 5A), the cartridge evaporator 38 has an inner chamber 126 and a bore 128 which extends from the first end surface 130 of the cartridge evaporator to the inner chamber 126. A metering tube 132 extends into the bore 128 and protrudes into the inner chamber 126 of the evaporator 38 for moving a refrigerant into the inner chamber 126 of the evaporator 38 at a predetermined rate. The metering tube 132 of Applicant's invention is a capillary tube having an outside diameter of 1.778 mm (0.07 inches) and an inside diameter of 0.5588 mm (0.022 inches). A return tube 134 extends out of the bore 128 for moving evaporated refrigerant out of the inner chamber 126 of the evaporator. In use, refrigerant flows into the inner chamber 126 through the metering tube 132 and evaporated refrigerant flows out of the inner chamber 126 through the return tube 134. Preferably, as shown in FIGS. 5A and 5B, the metering tube 132 passes through and is surrounded by the return tube 134, thus providing protection for the metering tube 132.

Preferably, the first end 138 of the cartridge evaporator 38 has a cap 136 which is fixedly fitted over the first end 138 of the cartridge evaporator 38. The cap 136 has a side wall 140 which extends along the outer surface 39 of the evaporator 38 for at least a portion of the length of the outer surface 39. The cap 136 has a first end 144 which is closed, and a second end 146 which has a face 150 with a sufficiently large bore 148 in it for the second end 146 of the cap 136 to fit over the first end 138 of the evaporator 38. The face 150 of the second end 146 of the cap 38 has an outside diameter which is greater than the diameter of the central bore 36 of the adapter 38 serving as the cartridge evaporator receiving port 36. Thus, when the second end 152 of the evaporator 38 having this cap 136 is inserted into the central bore 36 at one end of the adapter body 30, 78 and pushed along the bore 36, the face of the cap 136 eventually comes to rest against the end face (32 or 34) of that adapter 30, 78.

Figure 7:
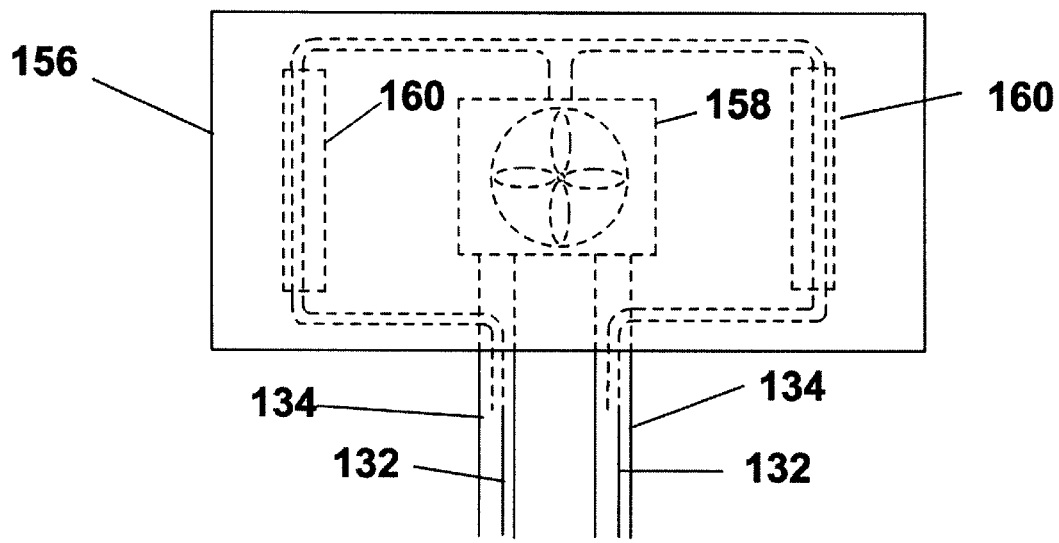
FIG. 7 is a diagrammatic plan view of the refrigeration unit of FIG. 1.

As shown in FIGS. 1 and 13, in which a nonexpendable refrigerant is being used, Applicant's invention contemplates a complete pipe freezing system 154 for freezing the contents of a section of pipe 22. As shown in FIG. 7 which shows the interior details of the refrigeration unit, this pipe freezing system 154 consists of a refrigeration unit 156 having a compressor 158 for compressing the refrigerant from a low pressure to a high pressure, a pair of condensers 160, 160 downstream of the compressor 158 for condensing the refrigerant from a high temperature gas to a lower temperature liquid, Applicant's multi-cavity adapter 20, fastened to the section of pipe 22 which is to be frozen, and a cartridge type evaporator 38 inserted into a cartridge receiving port 36 of the multi-cavity adapter 20. Metering tubes 132, 132 extend between the condensers 160, 160 of the refrigeration unit 156 and the evaporators 38, 38 for moving the refrigerant to the evaporators 38, 38. Return tubes 134, 134 extend between the evaporators 38, 38 and the compressor 158 of the refrigeration unit 156 for moving refrigerant from the evaporators 38, 38 to the compressor 158.

Refrigerant enters each evaporator 38 through a metering device such as capillary tube 132, or a thermostatic expansion valve (not shown), or an automatic expansion valve (not shown), or a fixed orifice (not shown). The pressure within the evaporator chamber 126 is much lower than the liquid entering. As shown in FIG. 16, as the liquid enters the chamber 126, it expands 170 into a saturated vapor, reducing its pressure and temperature. Because higher temperature travels to cooler temperature, this evaporation results in the removal of heat from evaporators 38, 38. Then superheated refrigerant returns via return suction tube 134 to the compressor 158 (FIG. 7).

As in FIGS. 3 and 5, when the evaporators 38, 38 are positioned within the central evaporator receiving ports 36, 36 of the adapter bodies 30, 78 of the multi cavity adapter 20, the heat will flow from the adapter bodies 30, 78, and when the adapter 20 is cradling a pipe 22, heat is removed from the pipe 22. For best thermal transfer, water, or any heat transfer media, may be sprayed between pipe 22 and the adapter bodies 30, 78, and in the evaporator receiving ports 36, 36 of the adapter bodies 30, 78 before placing the evaporators 38, 38 therein.

As shown by FIG. 13A, in the special case where an expendable refrigerant is being supplied by a tank of refrigerant, a complete pipe freezing system 200 will consist of Applicant's multi-cavity adapter 20 fastened to the section of pipe 22 which is to be frozen, and a cartridge evaporator 38 is inserted into a cartridge receiving port 36 of one of the adapter bodies 30, 78. A metering input tube 132 extends between the tank 202 and the evaporator 38 for receiving refrigerant at its first end 204 from the tank 202 and for moving the refrigerant out of its second end 206 (see FIG. 5B) to the evaporator 38 at a predetermined rate. Preferably, the metering input tube 132 extends into the evaporator 38, a distance which is three quarters of the length of the evaporator 38. (Please see FIGS. 5B and 15.) Evaporated refrigerant is expelled to the atmosphere through the return tube 208 which, for expendable refrigerants, is actually a discharge vent. Preferably, this discharge vent 208 extends to a safe discharge area 210. (A typical flow rate would be 0.675 kg (1.5 pounds) in 5 minutes for a 3.81 cm (1.5 inch) ID copper pipe with an ambient temperature of 70 F. The time to freeze the section of pipe 22 under these circumstances would be about 13 minutes.) The tank 202, of course, should be sufficiently charged with refrigerant to freeze the contents of the section of pipe 22. Since the metering tube 132 is somewhat fragile, Applicant's invention utilizes a protective hose or tube 212 (which will be referred to as the original protective tube) to encircle the metering input tube 132 for at least a portion of the length of the metering input tube 132.

Figure 13B:
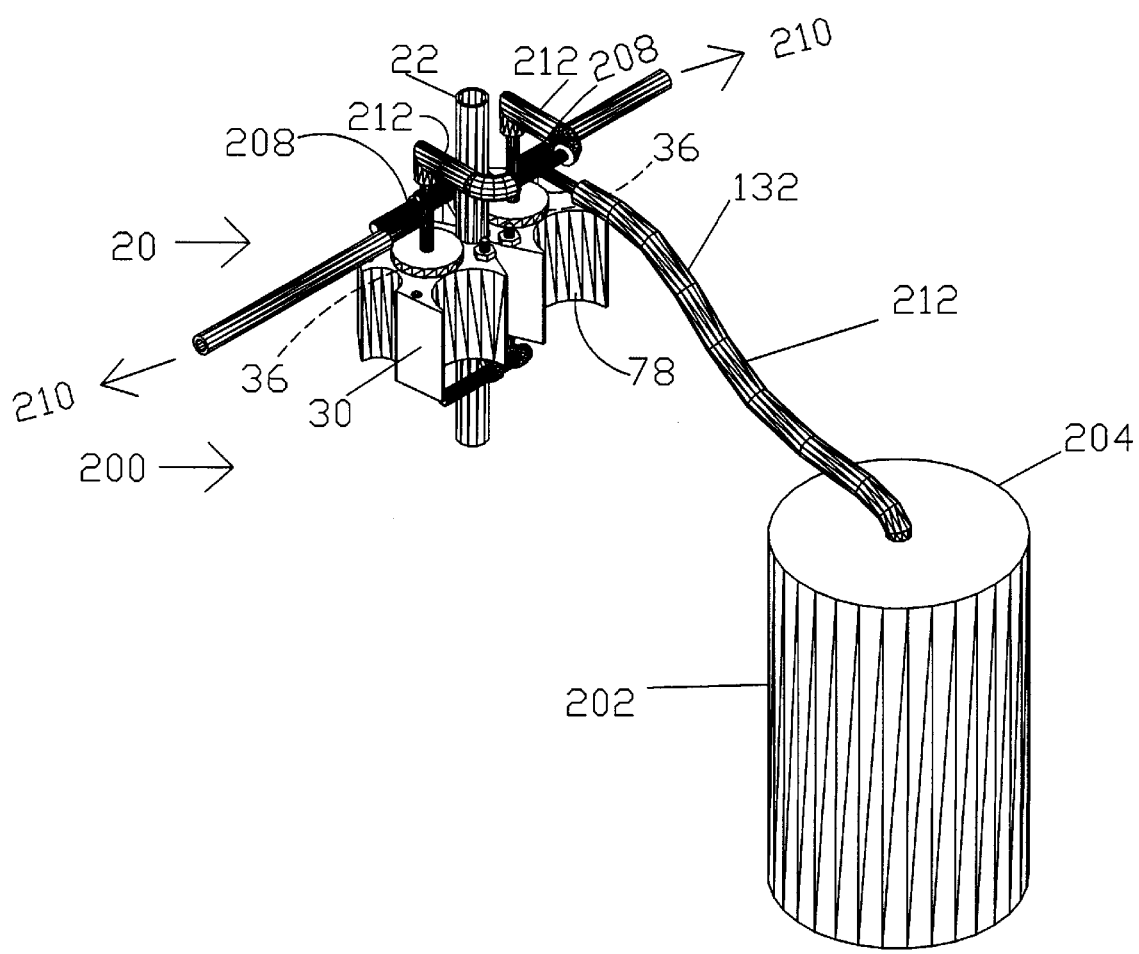
FIG. 13B shows a perspective view of a pipe freezing system having one evaporator utilizing expendable refrigerants which utilizes my multi cavity adapter.
Figure 14:
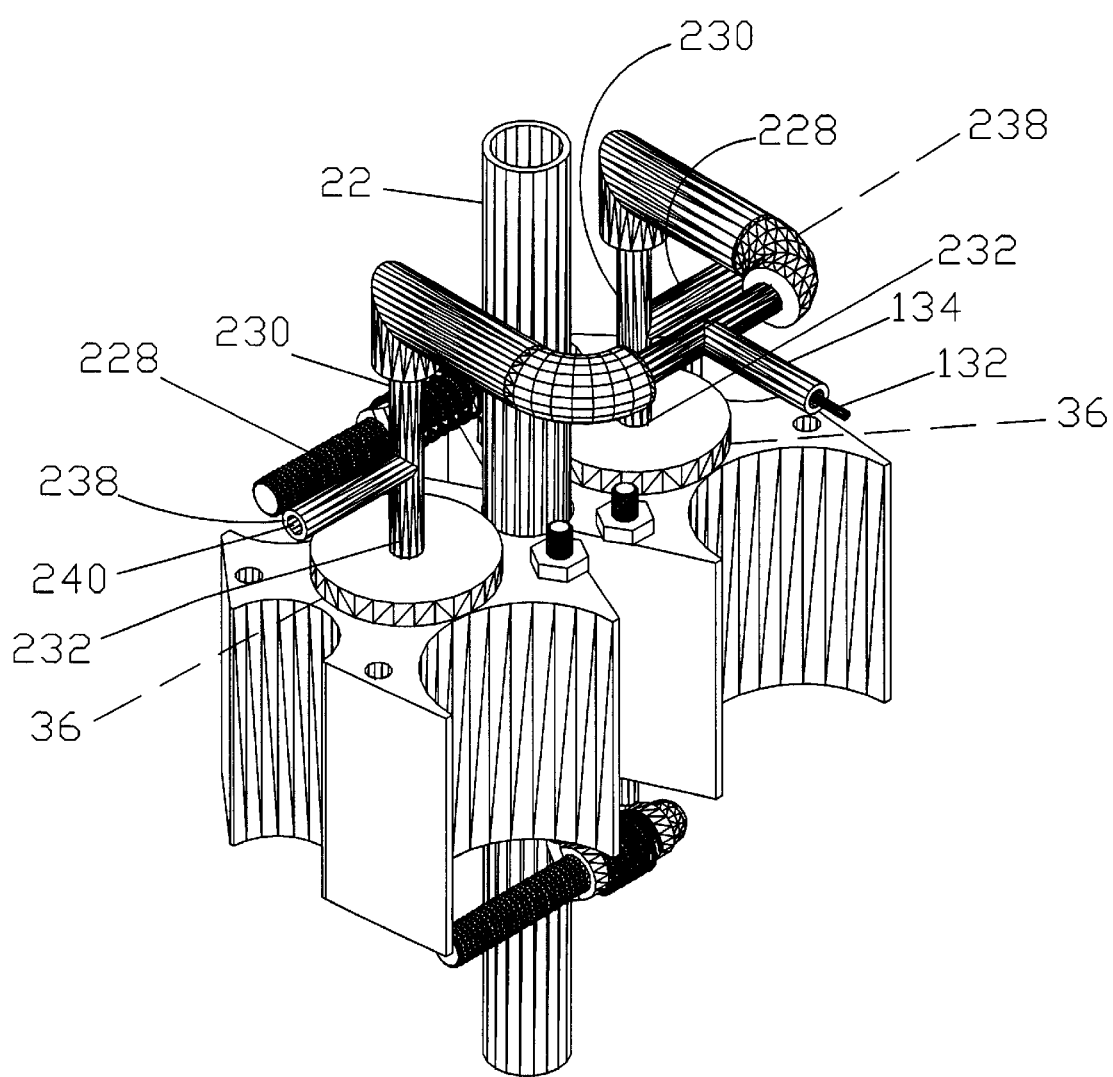
FIG. 14 is an enlarged perspective view of FIG. 13 with most of the protective hose and the tank removed.

Most preferably, as shown by FIG. 13B, in the above pipe freezing system using expendable refrigerants, a cartridge evaporator 38 is inserted into the cartridge receiving ports 36, 36 of each of the adapter bodies 30, 78 of the multi-cavity adapter 20. (Please see FIGS. 5A and 5B.) For this configuration, as shown in FIGS. 13B–15, a metering input tube 132 extends outward from the tank 202 for receiving refrigerant at its first end 204 from the tank 202 and for moving the refrigerant out of its second end 206 (FIG. 15) at a predetermined rate. Preferably this metering input tube 132 is a capillary tube. An input tee 214 is situated between the second end of this metering input tube 132 and the two evaporators 38, 38. This input tee 214 has an input port 216 and two output ports 218, 218. This tee 214 receives refrigerant from the second end 206 of the metering input tube 132 through the tee's input port 216 and supplies refrigerant out of each of the tee's two output ports 218, 218. An additional metering input tube 220, 220 is situated between each of the two output ports 218, 218 of the tee 214 and each of the two evaporators 38, 38. These additional metering input tubes 220, 220 receive refrigerant from each of the two output ports 218, 218 of the input tee 214 at their reception ends 222, 222 and supply this refrigerant out of their supply ends 224, 224 to each of the two evaporators 38, 38. Preferably, these additional metering input tubes 220, 220 are capillary tubes as well. An additional protective tube (220 with 226) extends from each evaporator 38, 38. An additional protective tube (220 with 226) encircles each of the two additional metering input tubes 220 for at least a portion of the length of each additional metering input tube 220. Discharge vents 208, 208 extend from the bore 128, 128 of each evaporator 38, 38 so that evaporated refrigerant can flow from the inner chamber 126 of each evaporator 38, 38 and be expelled to a safe environment 210, 210. Preferably, as shown in FIGS. 13A–15, each of the evaporators 38, 38 is equipped with a supply/discharge tee 228, 228. These supply/discharge tees 228, 228 are mounted on the evaporators 38, 38 such that the central axes of their straight through legs 230, 230 are collinear with the central axes of the respective evaporators 38, 38. The supply ends 232, 232 of these supply/discharge tees 228, 228 are mounted directly in the central bores 128, 128 in the evaporator caps 136, 136. The reception ends 234, 234 of each supply/discharge tee 228, 228 are blocked off 236 (except for a hole through which one of the additional metering tubes 230, 230 passes). The bull end 238, 238 of each supply/discharge tee 228, 228 has an opening 240 to the atmosphere. With this configuration, the supply ends 224,224 of each of the additional metering input tubes 220, 220 enter the reception ends 234, 234 of the straight through legs 230, 230 of the supply/discharge tees 228, 228, pass through the straight through legs 230, 230, and exit the supply ends 232, 232 of the straight through legs 230, 230 of the supply/discharge tees 228, 228 on their way into the cartridge evaporators 38, 38. (Preferably, as noted above, these additional metering input tubes 220, 220 extend into each evaporator 38, 38 a distance which is three quarters of the length of each cartridge evaporator 38, 38.) In this preferred configuration, the return 242 from the cartridge evaporators 38, 38 is directly into the supply ends 232, 232 of the supply/discharge tees 228, 228. Since the reception ends are blocked off 234, 234 (except for the additional metering tubes 132, 132 which pass through those blockages 236, 236), expendable refrigerant passing into the supply ends 232, 232 of these supply/discharge tees 228, 228 is shunted out the bull ends 238, 238 (which function as a discharge vent) of the supply/discharge tees 228, 228, and thus is discharged into the atmosphere.

Figure 15:
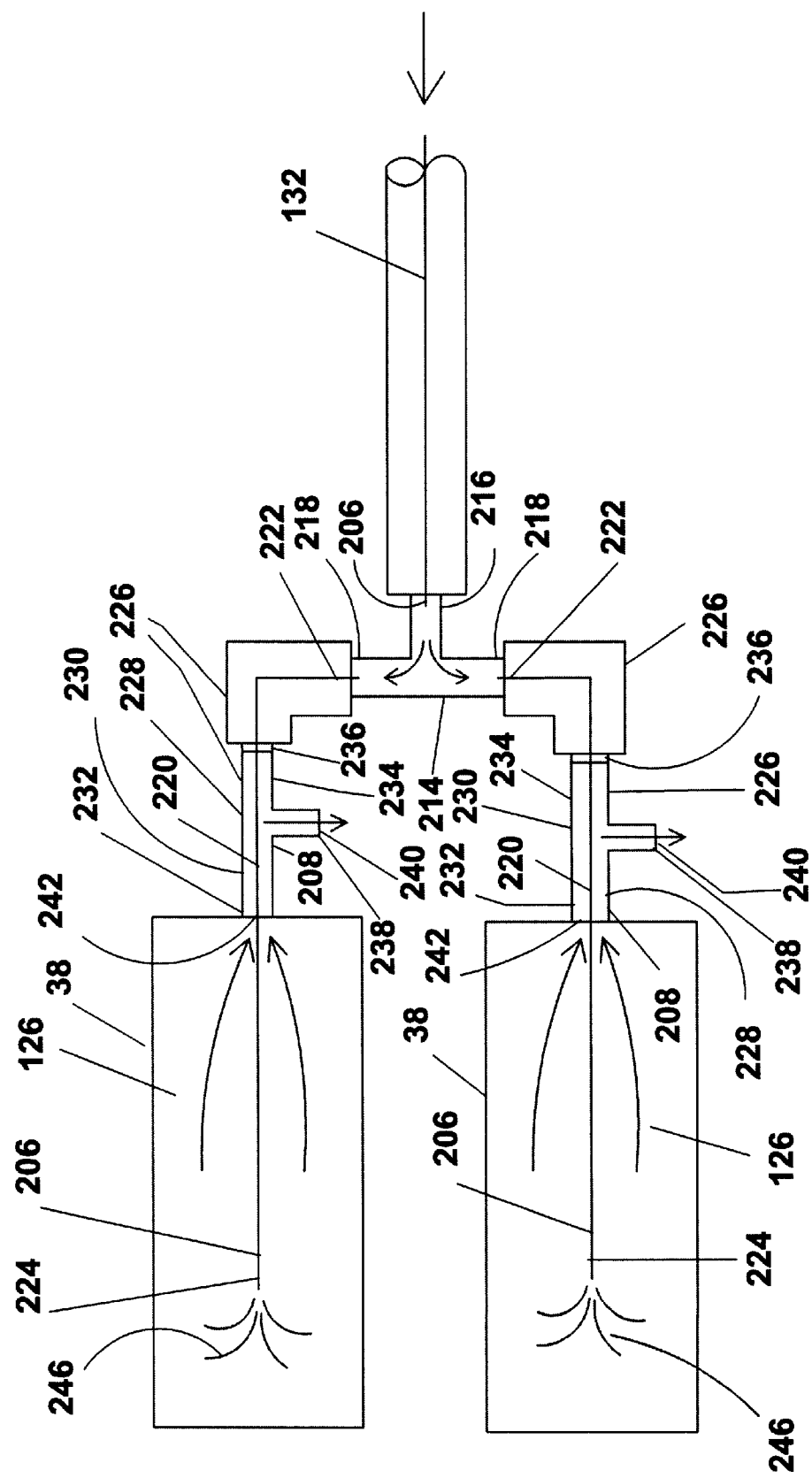
FIG. 15 is a diagrammatic plan view of the invention in use when using an expendable refrigerant.

As shown in FIG. 15, refrigerant enters the evaporators 38, 38 through a metering device such as capillary tube 220, or a thermostatic expansion valve (not shown), or an automatic expansion valve (not shown), or a fixed orifice (not shown). The pressure within the evaporator chamber 126 is much lower than the liquid entering. As the liquid enters the chamber 126, it expands 246 into a saturated vapor, reducing its pressure and temperature. Because higher temperature travels to cooler temperature, this evaporation 246 results in the removal of heat from evaporator 38, 38. Then the used refrigerant is shunted out the bull ends 238, 238 of the supply/discharge tees 228, 228, and thus is discharged into the atmosphere.(FIG. 15).

As in FIGS. 3 and 4, when the evaporators 38, 38 are positioned within the central evaporator receiving ports 36, 36 of the adapter bodies 30, 78 of multi cavity adapter 20, the heat will flow from the adapter bodies 30, 78, and when the adapter bodies 30, 78 of the multi cavity adapter 20 are cradling a pipe 22, heat is removed from the pipe 22. For best thermal transfer, water, or any heat transfer media, may be sprayed on the pipe section 22 to be frozen and the selected pipe receiving surfaces of the adapter bodies 30, 78, and also in the evaporator receiving ports 36, 36 of the adapter bodies 30, 78 before placing the cartridge evaporators 38, 38 therein.

It is preferred that the inside diameter of the capillary tubes used for the various metering tubes would compliment the evaporator by optimizing the freeze time versus refrigerant use. By properly metering the refrigerant through a fixed orifice, refrigerant usage can be minimized.

FIG. 17 shows a space in which the invention may be used. Limited access space 174 is available around pipe 22. Water is sprayed onto pipe 22 for good thermal contact. As in FIGS. 18 and 19, the pipe receiving surfaces 42–48 of each adapter body 30, 78 that best fit the pipe 22 to be frozen are selected, and the adapter bodies 30, 78 are oriented so that they encompass the pipe 22 to be frozen with the selected pipe receiving surfaces of the adapter bodies 30, 78 contacting the pipe 22. The water which was sprayed on the pipe section 22 and the selected pipe receiving surfaces acts as a thermal transfer medium.

As shown in FIGS. 18 and 19, the right angle elbow 176 in additional protective hose 226, 226 which surrounds the additional metering input tubes 220, 220 allows the unit to fit into the tight space without bending the additional protective hose 226, 226, thereby reducing wear-and-tear on the protective hose 226, 226 and the additional metering input tubes 220, 220 which are encircled by that protective hose 226, 226.

Below is an overview of the steps for freezing the contents of a pipe using a pipe freezing system which has a refrigeration system having a compressor, a condenser, a cartridge evaporator, and a multi-cavity adapter having a single adapter body which has a plurality of concave pipe receiving surfaces on its adapter body:

(a) based on the diameter of the section of pipe to be frozen, select the proper concave pipe receiving surface of the adapter body.

(b) align and secure the adapter to the pipe such that the proper concave surface engages the pipe.

(c) insert a cartridge evaporator in the evaporator receiving port of the adapter body of the multi cavity adapter.

(d) circulate a refrigerant through the refrigeration system thereby reducing the temperature of the evaporator and the adapter within which it is inserted. As a result, the temperature of the pipe is reduced which causes the contents of the pipe to freeze.

Following is a more detailed view of the steps of Applicant's preferred method for mounting a single multi-cavity adapter on the section of pipe to be frozen and installing a cartridge evaporator into the evaporator cartridge receiving bore of the multi-cavity adapter:

(a) wet the outer surface of the section of pipe to be frozen.

(b) select the pipe receiving surface of the adapter which has a diameter equal to the outside diameter of the pipe to be frozen.

(c) wet the pipe-receiving surface.

(d) hold the elongated cylindrically shaped piece of thermally conductive material against the pipe to be frozen such that the pipe rests in the pipe receiving surface.

(e) strap the adapter to the pipe with an adjustable strap, and tighten the adjustable strap.

(f) wet the evaporator receiving surface of the bore of the adapter.

(g) insert a cartridge evaporator into the cartridge receiving bore of the adapter.

Following is an overview of the steps for freezing the contents of a pipe using a pipe freezing system which has a refrigeration system having a compressor, a condenser, two cartridge evaporators, and two multi-cavity adapters, the adapter bodies of each of which have a plurality of concave pipe receiving surfaces on their adapter body:

(a) based on the diameter of the section of pipe to be frozen, select the proper concave pipe receiving surfaces of the adapter bodies.

(b) align and secure each adapter to the pipe such that the proper concave surface of each adapter engages the pipe and the concave pipe receiving surface of each adapter is aligned with and facing the concave pipe receiving surface of the other adapter.

(c) insert a cartridge evaporator in the evaporator receiving port of the adapter body of the multi cavity adapter.

(d) circulate a refrigerant through the refrigeration system thereby reducing the temperature of the evaporator and the adapter within which it is inserted. As a result, the temperature of the pipe is reduced which causes the contents of the pipe to freeze.

Following is a more detailed view of the steps of Applicant's preferred method for mounting two multi-cavity adapters on the section of pipe to be frozen and installing the cartridge evaporators into each multi-cavity adapter:

(a) position the primary and secondary adapter bodies such that the pipe receiving surface of the first adapter body which has a diameter equal to the outside diameter of the pipe to be frozen is facing and aligned with the pipe receiving surface of the second adapter having that same.

(b) orient the first retainer mechanism with respect to a first side of the section of pipe to be frozen such that the central axes of the pin bodies of the first retainer mechanism are substantially parallel to the central axis of the section of pipe to be frozen.

(c) turn the offset golf club-like heads of the first retainer mechanism such that the offset golf club-like heads are oriented away from the section of pipe.

(d) simultaneously insert the second ends of the first and second locking pins of the first retainer mechanism into corresponding locking channels of the primary and secondary adapter bodies, thus forming a hinge. Now the primary and secondary adapter bodies are swivelable with respect to each other.

(e) secure the ends of the first and second locking pins of the first retainer mechanism with nuts.

(f) swivel the primary and secondary adapter bodies outward with respect to each other.

(g) wet the outer surface of the section of pipe to be frozen.

(h) wet those pipe-receiving surfaces of the multi-cavity adapter which are to receive the section of pipe to be frozen.

(i) drape the hinged primary and secondary adapter bodies around the pipe to be frozen.

(j) swivel the primary and secondary adapter bodies toward each other.

(k) orient the second retainer mechanism with respect to the side opposite the first side of the section of pipe to be frozen such that the central axes of the pin bodies of the second retainer mechanism are substantially parallel to the central axis of the section of pipe to be frozen.

(l) turn the offset golf club-like heads of the second retainer mechanism such that the offset golf club-like heads are oriented away from the section of pipe to be frozen.

(m) simultaneously insert the second ends of the first and second locking pins of a second retainer mechanism into corresponding locking channels of the primary and secondary adapter bodies, thus securing the section of pipe to be frozen.

(n) wet the evaporator receiving surface of the bore of the adapter.

(o) insert cartridge evaporators into the evaporator receiving ports of each of the adapter bodies.

5.3 Advantages of the Invention

The previously described multi cavity adapter has many advantages, including:

(a) Rather than have many individual adapters (Eight for a four cavity adapter), only two are required.

(b) The evaporator can swivel within the adapter body of a multi cavity adapter reducing stress on the protective hose and the input metering tube contained therein.

(c) Angle adapters are not required, because the evaporator is angled at 90 degrees from the hoses.

(d) The adapters can be exchanged for different sizes to go from metric to US standard sizes.

(e) If any pipe receiving surface is damaged, the adapter body can be replaced without entering the sealed system.

(f) The evaporator is protected by the adapter body of the Multi-Cavity Adapter.

The chance of refrigerant leakage is reduced, because the number of welded areas are reduced, and, when ported within the adapter, evaporator damage due to rough handling is less likely, because the evaporator is sheltered by the adapter body of the multi cavity adapter.

LIST OF REFERENCE NUMBERS 20 multi cavity adapter
22 liquid filled pipe
24 liquid contents of pipe
26 ice blockage in pipe
28 cut in pipe
30 elongated piece of thermally conductive material (primary adapter body)
31 second primary adapter in row in FIG. 7
32 first end face of adapter body
34 second end face of adapter body
36 bore for reception of a cartridge evaporator
38 cartridge evaporator
39 outer surface of cartridge evaporator
40 outer surface of adapter body
42 pipe receiving surface #1 (for pipes with an outside diameter of 1.651 cm (0.65 in))
44 pipe receiving surface #2 (for pipes with an outside diameter of 2.286 cm (0.90 in))
46 pipe receiving surface #3 (for pipes with an outside diameter of 2.921 cm (1.15 in))
48 pipe receiving surface #4 (for pipes with an outside diameter of 4.191 cm (1.65 in))
50 first corner edge of pipe receiving surface #1
52 second corner edge of pipe receiving surface #1
54 first corner edge of pipe receiving surface #2
56 second corner edge of pipe receiving surface #2
58 first corner edge of pipe receiving surface #3
60 second corner edge of pipe receiving surface #3
62 first corner edge of pipe receiving surface #4
64 second corner edge of pipe receiving surface #4
66 a corner point of the first end face
68 a corner point of the second end face
70 bushing adapter
72 outer surface of bushing adapter
74 inner surface of bushing adapter
78 second elongated piece of thermally conductive material (secondary adapter body)
80 row of two primary adapters 30, 31
82 row after primary adapter 31 is rotated by 180 degrees
84 row after primary adapter 31 is turned upside down
86 locking channel
88 channel opening in first end face
89 channel opening in second end face
90 first retainer mechanism
92 second retainer mechanism
94 first prong
96 second prong
98 end of prong
100 nut
102 first locking pin
104 second locking pin
106 first end of retainer mechanism
108 golf club-like head with a nonthreaded hole
110 golf club-like head with a threaded hole
112 nonthreaded hole
114 threaded hole
116 straight pin
118 spring under tension
120 threaded second end of locking pin
122 first end of straight pin with an Allen head
124 strap with hook and loop material at the ends thereof
126 inner chamber of cartridge evaporator
128 bore of cartridge evaporator
130 first end surface of cartridge evaporator
132 metering input tube
134 return tube
136 evaporator cap
138 first end of cartridge evaporator
140 side wall of evaporator cap
142 an evaporator cap turned upside down to show details
144 first end of evaporator cap
146 second end of evaporator cap
148 bore in second end of evaporator cap
150 face of second end of evaporator cap
152 second end of evaporator
154 complete pipe freezing system using nonexpendable refrigerants
156 refrigeration unit
158 compressor
160 condenser
162 discharge vent
164 first end of metering input tube
166 second end of metering input tube
168 return from the cartridge evaporator
170 expansion of liquid entering the evaporator chamber
172 supply end of metering input tube
174 limited access space
176 right angle elbow in return tube surrounding metering input tube
200 pipe freezing system utilizing expendable refrigerants
202 tank containing expendable refrigerant
204 first end of metering input tube
206 second end of metering input tube
208 discharge tube or vent
210 safe discharge area
212 protective hose or tube
214 input tee
216 input port of tee
218 output port of tee 220 additional metering input tube
222 reception end of additional metering input tube
224 supply end of additional metering input tube
226 additional protective tube
228 supply/discharge tee
230 straight through leg of supply/discharge tee
232 supply end of straight through leg of supply/discharge tee
234 reception end of supply/discharge tee
236 blocked off portion of supply/discharge tee
238 bull end of supply/discharge tee
240 opening in bull end of supply/discharge tee
242 return from the cartridge evaporator
246 expansion of liquid entering the evaporator chamber It will be understood that each of the elements described above, or two or more together may also find a useful application in other types of devices and methods differing from those types described above.

Alternatives and the Closing

Thus the reader will see that my multi cavity adapter supplies a long felt need for a simple, economical, easy to use means for freezing a plug of ice in a section of pipe. If one should aver that my multi cavity adapter is obvious, then one is hard put to explain why users of pipe freezers continue to use pipe freezing methods without the advantages of Applicant's invention.

Although the present invention has been described in considerable detail with reference to certain preferred versions thereof, other versions are possible which will be apparent to those who are skilled in the art. While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention. Therefore, the spirit and scope of the appended claims should not be limited to the description of the preferred versions contained herein, but by the appended claims and their legal equivalents.

What is claimed is:

1. A multi-cavity adapter for a pipe freezer, said adapter comprising an adapter body, said adapter body being an elongated piece of thermally conductive material having a predetermined length, said adapter body comprising:
   (a) a first end face;
   (b) a second face;
   (c) a bore passing through said adapter body, said bore serving as a cartridge evaporator receiving port for the reception of a cartridge evaporator therein, said bore having a predetermined diameter, said bore having an inner surface, said bore extending from the first end face to the second end face of said adapter body;
   (d) an outer surface having a plurality of concave pipe receiving surfaces, each concave pipe receiving surface having a specific distinct radius of curvature, whereby pipes with different outside diameters can be accommodated, the intersection of each said pipe receiving surface and said outer surface defining a first corner edge and a second corner edge of each said pipe receiving surface, the intersection of each corner edge with said first end face defining a corner point of said first end face, the intersection of each corner edge with said second end face defining a corner point of said second end face; and
   (e) a first locking channel and a second locking channel situated near the corner points of each pipe receiving surface, said locking channels passing through said adapter body, said locking channels extending from the first end face to the second end face of said adapter body, said first locking channel having a first channel opening in the first end face and a second channel opening in the second end face, said second locking channel having a first channel opening in the first end face and a second channel opening in the second end face.

2. The multi-cavity adapter of claim 1 wherein the concave pipe-receiving surfaces have arcs of approximately 180°.

3. The multi-cavity adapter of claim 2, further comprising a bushing adapter having an outer surface and an inner surface, the outer surface being convex and complimentary to one of the concave pipe receiving surfaces of the adapter and the inner surface being concave and having a specific distinct radius different from those of the adapter and adapted to receive a pipe.

4. The multi-cavity adapter of claim 1, further comprising a fastening mechanism for securing the adapter to the pipe.

5. The multi-cavity adapter of claim 1, wherein the bore is a central bore.

6. The multi-cavity adapter of claim 4, further comprising a second adapter body, which is substantially a mirror image of the first adapter body, whereby when a hollow concavity of the first adapter body is aligned, caused to face, and brought into contact with the hollow concavity of the second adapter body which has the same radius of curvature as the aligned hollow concavity of the first adapter body, a cylindrical channel is formed for the reception of a pipe to be frozen.

7. The multi-cavity adapter of claim 6, wherein said fastening mechanism comprises:
   (a) a first retainer mechanism having a first prong and a second prong, said first prong being adapted to be received into a channel opening of the first adapter body, and said second prong being adapted to be received into a channel opening of the second adapter body, so that when the first and second adapter bodies are aligned such that a pipe receiving surface of the first adapter body is facing the pipe receiving surface of the second adapter body which has the same radius of curvature as the pipe receiving surface of the first adapter body, the first and second adapter bodies can be hingedly fastened together by the first retainer mechanism, such that the first and second adapter bodies can be draped around the section of pipe which is to be frozen; and
   (b) a second retainer mechanism having a first prong and a second prong, said first prong being adapted to be received into a channel opening of the first adapter body, and said second prong being adapted to be received into a channel opening of the second adapter body, so that the first and second adapter bodies can be fastened together, such that the first and second adapter bodies can tightly encompass and secure the section of pipe which is to be frozen.

8. The multi-cavity adapter of claim 7, wherein:
   (a) said prongs of said retainer mechanisms are threaded at the ends thereof; and
   (b) said first retainer mechanism further comprises nuts for threading onto the ends of said threaded prongs for securing the first retainer mechanism in the locking channels.

9. The multi-cavity adapter of claim 6, wherein said fastening mechanism comprises:

(a) a first retainer mechanism comprising:
  (i) a first locking pin having a first end and a second end, said first end having an offset golf club-like head having a nonthreaded hole of first predetermined diameter therein, said second end being threaded;
  (ii) a second locking pin having a first end and a second end, said first end having an offset golf club-like head having a threaded hole of second predetermined diameter therein, said second predetermined diameter being smaller than said first predetermined diameter, said second end of said second locking pin being threaded;
  (iii) a straight pin of said second predetermined diameter, said straight pin having a first end with an Allen head with a diameter larger than said first predetermined diameter, and a second end which is threaded, said straight pin being adapted to be inserted into the nonthreaded hole of the offset golf club like head of first locking pin, pushed through that hole until it engages the threaded hole of said offset golf club like head of said second locking pin, and screwed into said threaded hole of said second locking pin; and
  (iv) nuts for the second end of each locking pin for securing the first retainer mechanism in the locking channels,
wherein said first locking pin is adapted to be received into a channel opening of the first adapter body, and said second locking pin is adapted to be received into a channel opening of the second adapter body, so that when the first and second adapter bodies are aligned such that a pipe receiving surface of the first adapter body is facing the pipe receiving surface of the second adapter body which has the same radius of curvature as the pipe receiving surface of the first adapter body, the first and second adapter bodies can be hingedly fastened together by the first retainer mechanism, such that the first and second adapter bodies can be draped around the section of pipe which is to be frozen;
(b) a second retainer mechanism comprising:
  (i) a first locking pin having a first end and a second end, said first end having an offset golf club like head having a nonthreaded hole of said first predetermined diameter therein;
  (ii) a second locking pin having a first end and a second end, said first end having an offset golf club like head having a threaded hole of said second predetermined diameter therein, said second predetermined diameter being smaller than said first predetermined diameter; and
  (iii) a straight pin of said second predetermined diameter, said straight pin having a first end with an Allen head with a diameter larger than said first pre-determined diameter, and a second end which is threaded, said straight pin being adapted to be inserted into the nonthreaded hole of the offset golf club like head of first locking pin, pushed through that hole until it engages the threaded hole of said golf club like head of said second locking pin, and screwed into said threaded hole of said second locking pin;
wherein said first locking pin is adapted to be received into a channel opening of the first adapter body, and said second locking pin is adapted to be received into a channel opening of the second adapter body, so that the first and second adapter bodies can be fastened together, such that the first and second adapter bodies can tightly encompass and secure the section of pipe which is to be frozen.

10. The multi-cavity adapter of claim 9, wherein a spring under tension is mounted on the straight pin of each retainer mechanism, said spring serving to push apart and hold the first and second locking pins in substantially parallel alignment to one another, whereby said pins can be inserted simultaneously into said locking channels.

11. An apparatus for freezing the contents of a section of pipe using a refrigerant, the apparatus comprising:
  (a) a refrigeration unit comprising:
    (i) a compressor for compressing the refrigerant from a low pressure to a high pressure;
    (ii) a condenser downstream of the compressor for condensing the refrigerant from a high temperature gas to a lower temperature liquid;
  (b) the multi-cavity adapter of claim 7, draped around the section of pipe which is to be frozen,
  (c) a cartridge evaporator having a predetermined length and a predetermined outside diameter, said evaporator comprising:
    (i) an outer surface, a first end having a surface, and a second end having a surface;
    (ii) an inner chamber;
    (iii) a bore extending from the first end surface to the inner chamber;
    (iv) a metering tube extending into the bore and protruding into the inner chamber of the evaporator for moving a refrigerant into the inner chamber of the evaporator at a predetermined rate; and
    (v) a return tube extending out of the bore for moving evaporated refrigerant out of the inner chamber of the evaporator;
said cartridge evaporator being inserted into a cartridge receiving port of said multi-cavity adapter, and wherein:
    (i) the metering tube extends between the con-denser of the refrigeration unit and the evaporator for moving the refrigerant to the evaporator; and
    (ii) the return tube extends between the evaporator and the compressor of the refrigeration unit for moving refrigerant from the evaporator to the compressor.

12. The apparatus of claim 11 wherein the first end surface of the cartridge evaporator comprises a cap which is fitted over the first end of the cartridge evaporator, said cap having a side wall which extends along the outer surface of the evaporator for at least a portion of the length of the outer surface, said cap having a first end which is closed, and a second end having a face with a sufficiently large bore therein for the second end to fit over the first end of the evaporator, said face having an outside diameter which is greater than the diameter of the bore serving as the cartridge evaporator receiving port, whereby when said second end of said evaporator is inserted into the bore at one end of said adapter and pushed along said bore, said face of said cap eventually comes to rest against the end face of that adapter.

13. The apparatus of claim 4, wherein said metering tube extends into the evaporator, a distance which is three quarters of the length of the evaporator.

14. An apparatus for freezing the contents of a section of pipe using an expendable refrigerant, the apparatus comprising:
  (a) a tank having an adequate amount of liquid refrigerant to freeze the contents of the section of pipe;
  (b) the multi-cavity adapter of claim 7, draped around the section of pipe which is to be frozen;
  (c) a cartridge evaporator having a predetermined length and a predetermined outside diameter, said evaporator comprising:

(i) an outer surface, a first end having a surface, and a second end having a surface;
(ii) an inner chamber;
(iii) a bore extending from the first end surface to the inner chamber;
(iv) a metering tube extending into the bore and protruding into the inner chamber of the evaporator for moving a refrigerant into the inner chamber of the evaporator at a predetermined rate; and
(v) a return tube extending out of the bore for moving evaporated refrigerant out of the inner chamber of the evaporator; and
(vi) an original protective tube encircling the metering tube for at least a portion of the length of the metering tube;
said cartridge evaporator being inserted into a cartridge receiving port of said multi-cavity adapter, and wherein
(i) the metering tube has a first end and a second end, and said metering tube extends between the tank and the evaporator for receiving refrigerant at its first end from the tank and for moving the refrigerant out of its second end into the evaporator at a predetermined rate; and
(ii) the return tube is a discharge vent and evaporated refrigerant is expelled to the atmosphere through said discharge vent.

15. The apparatus of claim 14 wherein the first end surface of the cartridge evaporator comprises a cap which is fitted over the first end of the cartridge evaporator, said cap having a side wall which extends along the outer surface of the evaporator for at least a portion of the length of the outer surface, said cap having a first end which is closed, and a second end having a face with a sufficiently large bore therein for the second end to fit over the first end of the evaporator, said face having an outside diameter which is greater than the diameter of the bore serving as the cartridge evaporator receiving port, whereby when said second end of said evaporator is inserted into the bore at one end of said adapter and pushed along said bore, said face of said cap eventually comes to rest against the end face of that adapter.

16. The apparatus of claim 14, wherein said metering tube extends into the evaporator, a distance which is three quarters of the length of the evaporator.

17. The apparatus of claim 14, wherein said discharge vent extends to a safe discharge area.

18. The apparatus of claim 14, further comprising a second cartridge evaporator, and wherein:
(a) a cartridge evaporator is inserted into each of the two cartridge receiving ports of said multi-cavity adapter;
(b) the metering tube has a first end and a second end, and said metering tube extends outward from the tank for receiving refrigerant at its first end from the tank and for moving the refrigerant out of its second end at a predetermined rate; and
(c) the discharge vents extending from the bore of each evaporator are for moving evaporated refrigerant from the inner chamber of each evaporator to a safe environment;
and the apparatus further comprises:
(a) a tee situated between the second end of the metering tube and the evaporator, said tee having an input port and two output ports, said tee receiving refrigerant from the second end of said metering tube through the tee's input port and supplying refrigerant out of each of its two output ports;
(b) an additional metering tube situated between each of the two output ports of the tee and each of the two evaporators for receiving refrigerant from each of the two output ports of the tee and supplying this refrigerant to each of the two evaporators; and
(c) an additional protective tube extending from the second evaporator, wherein both the original protective tube and the additional protective tube encircle each of said two additional metering tubes for at least a portion of the length of each additional metering tube.

19. The apparatus of claim 11, wherein the metering tube is a capillary tube.

20. The apparatus of claim 18, wherein the metering tube and the two additional metering tubes are capillary tubes.

21. A method of freezing the contents of a pipe having an outside diameter, said method comprising the following steps:
(a) providing a refrigeration system having a compressor, a condenser, a cartridge evaporator, and the multi-cavity adapter of claim 7 the concave pipe receiving surfaces of the first and second adapter bodies which correspond to the outside diameter of the pipe;
(c) aligning and securing the adapter bodies to one another and to the pipe utilizing the first and second retainer mechanisms such that the proper concave surface of each adapter body engages the pipe and the concave pipe receiving surface of each adapter body is aligned with and facing the proper concave pipe receiving surface of the other adapter body;
(d) inserting a cartridge evaporator in the evaporator receiving port of at least one of the adapters;
(e) circulating a refrigerant through the refrigeration system thereby reducing the temperature of the evaporator and the adapter within which it is inserted, which then reduces the temperature of the pipe, thus causing the contents of the pipe to freeze.

22. A method of mounting the multi-cavity adapter of claim 9 on a section of pipe to be frozen and installing the cartridge evaporator of claim 11 into said multi-cavity adapter, said method comprising the steps of:
(a) positioning the first and second adapter bodies such that the pipe receiving surface of the first adapter body having a diameter equal to the outside diameter of the pipe to be frozen is facing and aligned with the pipe receiving surface of the second adapter body having the same said diameter equal to the outside diameter of the pipe;
(b) orienting the first retainer mechanism with respect to a first side of the section of pipe to be frozen such that the pin bodies of the first retainer mechanism are substantially parallel to the section of pipe to be frozen;
(c) turning the offset golf club-like heads of said first retainer mechanism such that said offset golf club-like heads are oriented away from said section of pipe;
(d) inserting the second end of the first locking pin of a first retainer mechanism into a locking channel of the first adapter body, and inserting the second end of the second locking pin of a first retainer mechanism into a locking channel of the second adapter body, thus forming a hinge, whereby the first and second adapter bodies are swivelable with respect to each other;
(e) securing the ends of the first and second locking pins of the first retainer mechanism with said nuts;
(f) swiveling first and second adapter bodies outward with respect to each other;
(g) wetting the outer surface of the section of pipe to be frozen;

(h) wetting those pipe-receiving surfaces of the adapter bodies which surfaces are to receive the section of pipe to be frozen;

(i) draping the hinged first and second adapter bodies around the pipe to be frozen;

(j) swiveling first and second adapter bodies toward each other;

(k) orienting the second retainer mechanism with respect to the side opposite the first side of the section of pipe to be frozen such that the pin bodies of the second retainer mechanism are substantially parallel to the section of pipe to be frozen;

(l) turning the offset golf club-like heads of said second retainer mechanism such that said offset golf club-like heads are oriented away from said section of pipe;

(m) inserting the second end of the first locking pin of a second retainer mechanism into a locking channel of the first adapter body, and inserting the second end of the second locking pin of the second retainer mechanism into a locking channel of the second adapter body, thus securing the section of pipe to be frozen;

(n) wetting the evaporator receiving surface of the bore of the adapter; and (o) inserting a cartridge evaporator into the bore for receiving an evaporator therein.

23. A method of mounting the multi-cavity adapter of claim 7 on a section of pipe to be frozen and installing the cartridge evaporator of claim 11 into said multi-cavity adapter, said method comprising the steps of:

(a) positioning the first and second adapter bodies such that the pipe receiving surface of the first adapter having a diameter equal to the outside diameter of the pipe to be frozen is facing and aligned with the pipe receiving surface of the second adapter having the same said diameter equal to the outside diameter of the pipe;

(b) orienting the first retainer mechanism with respect to a first side of the section of pipe to be frozen such that the prongs of the first retainer mechanism are substantially parallel to the section of pipe to be frozen;

(c) inserting a prong of the first retainer mechanism into a locking channel of the first adapter body, and inserting the other prong of the first retainer mechanism into a locking channel of the second adapter body, thus forming a hinge, whereby the first and second adapter bodies are swivelable with respect to each other;

(d) swiveling first and second adapter bodies outward with respect to each other;

(e) wetting the outer surface of the section of pipe to be frozen;

(f) wetting those pipe-receiving surfaces of the multi-cavity adapter which surfaces are to receive the section of pipe to be frozen;

(g) draping the hinged first and second adapter bodies around the pipe to be frozen;

(h) swiveling first and second adapter bodies toward each other;

(i) orienting the second retainer mechanism with respect to the side opposite the first side of the section of pipe to be frozen such that the prongs of the second retainer mechanism are substantially parallel to the section of pipe to be frozen;

(j) inserting a prong of the second retainer mechanism into a locking channel of the first adapter body, and inserting the other prong of the second retainer mechanism into a locking channel of the second adapter body, thus securing the section of pipe to be frozen;

(k) wetting the evaporator receiving surface of the bore of the adapter; and (l) inserting a cartridge evaporator into the bore for receiving an evaporator therein.

* * * * *

UNITED STATES PATENT AND TRADEMARK OFFICE
CERTIFICATE OF CORRECTION

PATENT NO. : 6,286,329 B1
DATED : September 11, 2001
INVENTOR(S) : Arthur Radichio Page 1 of 1

It is certified that error appears in the above-identified patent and that said Letters Patent is hereby corrected as shown below:

Claim 13,
Line 1, replace "claim 4" with -- claim 11 --.

Signed and Sealed this

Sixteenth Day of April, 2002

Attest:

Attesting Officer

JAMES E. ROGAN
Director of the United States Patent and Trademark Office